(12) United States Patent
Nakayama et al.

(10) Patent No.: US 7,347,508 B2
(45) Date of Patent: Mar. 25, 2008

(54) BRAKE SYSTEM AND METHOD FOR A TWO-WHEELED MOTOR VEHICLE

(75) Inventors: Masanobu Nakayama, Saitama (JP);
Kazuhiko Tani, Saitama (JP);
Yukimasa Nishimoto, Saitama (JP);
Hideo Takahashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 266 days.

(21) Appl. No.: 11/144,362

(22) Filed: Jun. 3, 2005

(65) Prior Publication Data
US 2006/0170280 A1 Aug. 3, 2006

(30) Foreign Application Priority Data
Jan. 28, 2005 (JP) ............................. 2005-021217

(51) Int. Cl.
*B60T 13/00* (2006.01)
(52) U.S. Cl. .................... 303/9.64; 303/9.65; 303/137; 303/186
(58) Field of Classification Search ............... 303/9.61, 303/9.64, 9.65, 9.71, 137, 186, 187; 188/344, 188/349
See application file for complete search history.

(56) References Cited
U.S. PATENT DOCUMENTS

| 5,320,423 | A | * | 6/1994 | Hashida ..................... 303/186 |
| 5,632,535 | A | * | 5/1997 | Luckevich et al. ......... 303/186 |
| 5,641,209 | A | * | 6/1997 | Kushi et al. ............... 303/9.71 |
| 6,089,679 | A | * | 7/2000 | Kushi et al. ............... 303/186 |
| 7,188,911 | B2 | * | 3/2007 | Tani et al. ................. 303/9.64 |
| 2005/0168059 | A1 | * | 8/2005 | Nishikawa et al. ............ 303/3 |
| 2005/0168062 | A1 | * | 8/2005 | Nishikawa et al. ........... 303/20 |

FOREIGN PATENT DOCUMENTS
JP 2002-29403 1/2002

* cited by examiner

*Primary Examiner*—Thomas Williams
(74) *Attorney, Agent, or Firm*—Carrier, Blackman & Associates, P.C.; Joseph P. Carrier; William D. Blackman

(57) ABSTRACT

A combined brake system and method, for a two-wheeled motor vehicle, is capable of synchronizing a braking operation of either a front or rear wheel with a braking operation of the other wheel. The brake system enables a rider to perform braking operations in which the rider feels no little or no discomfort. The system includes a pair of hydraulic pressure modulators for supplying hydraulic pressure, generated by an electrically-operated actuator, to front and rear brake calipers, respectively. A controller electrically controls each hydraulic pressure modulator in response to a riding condition for the vehicle and in response to a braking operation applied by the vehicle operator.

11 Claims, 20 Drawing Sheets

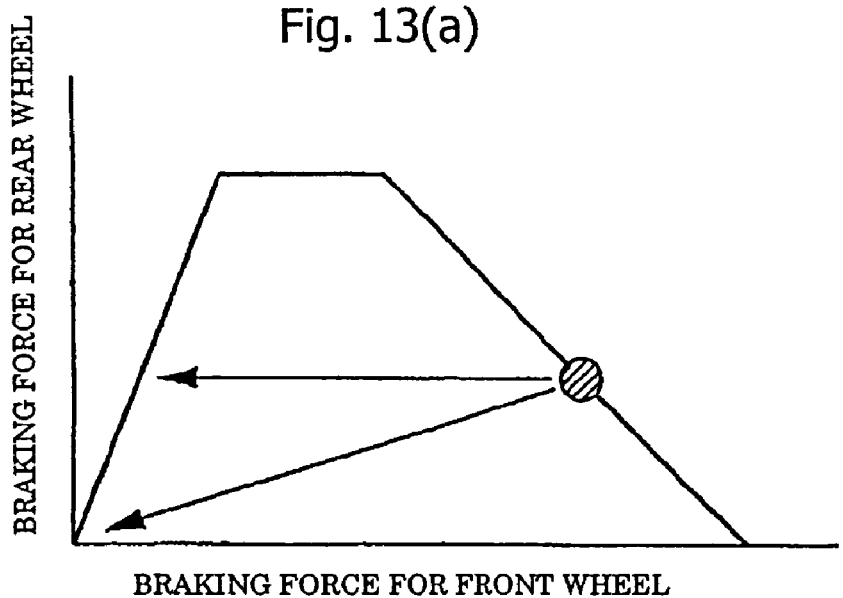
Fig. 13(a)
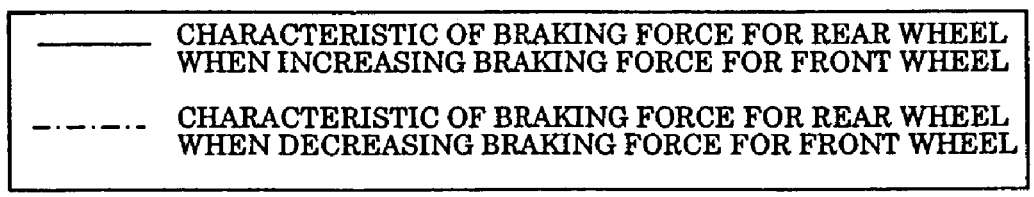
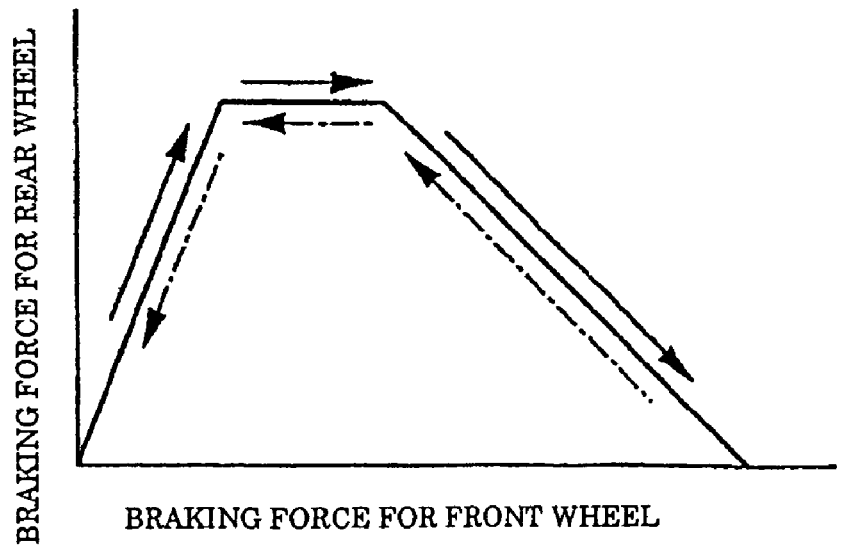
Fig. 13(b)
PRIOR ART

BRAKE SYSTEM AND METHOD FOR A TWO-WHEELED MOTOR VEHICLE

CROSS-REFERENCE TO RELATED APPLICATIONS

The present invention claims priority under 35 USC 119 based on Japanese patent application No. 2005-021217, filed on Jan. 28, 2005. The subject matter of this priority document is incorporated by reference herein.

BACKGROUND OF THE INVENTION

1. Field of the Invention

The present invention relates to a brake system and method for a two-wheeled motor vehicle. More particularly, the present invention relates to a brake system and method for a two-wheeled motor vehicle which is operable to coordinate a front wheel braking operation and a rear wheel braking operation at a proper output ratio for a given situation, depending on driving conditions and braking operations.

2. Background Art

A brake system for a two-wheeled motor vehicle may employ a combined brake system (CBS: COMBINED BRAKE SYSTEM; hereinafter referred to as "CBS") in which when a braking operation unit (lever or pedal) at either of a front wheel and a rear wheel is operated, hydraulic pressure is applied to wheel braking means for the wheel associated with the braking operation unit which has been operated. At the same time, hydraulic pressure is also applied, in an appropriate ratio, to wheel braking means for the other wheel for which the braking operation unit has not been operated.

Heretofore, a brake system employing CBS has been disclosed, such as for example, in Japanese Laid-Open Patent No. Hei 7 (1995)-196068.

In this brake system, a master cylinder synchronized with a brake lever (braking operation unit) at a front wheel is connected with a wheel braking means for the front wheel through a hydraulic passage; a second master cylinder which generates hydraulic pressure by use of a brake torque is provided at the wheel braking means at the front wheel; the second master cylinder and a wheel braking means for a rear wheel are connected with each other through another passage; and further a control valve, which controls the distribution ratio of hydraulic pressures to the front and rear wheels in response to a state of braking operation, is provided on the hydraulic passage.

The control valve is uniquely determined in a manner that the distribution ratio of hydraulic pressure for the front and rear wheels corresponds to an input hydraulic pressure (braking force). To be specific, as shown in FIG. 13(b), when a braking for the front wheel is gradually increased, a braking force for the rear wheel is proportionally increased until the braking force for the front wheel attains a setting value. The braking force for the rear wheel is thereafter held constant, and decreased in an inversely proportional manner when the braking force for the front wheel goes beyond a next setting value.

Accordingly, in this brake system, a braking efficiency is caused to increase by increasing the distribution of braking force to the rear wheel, while braking on the front wheel is operated within a certain defined range. When the brake at the front wheel is operated out of the range, the braking force on the rear wheel is gradually decreased, hence coping with reduction of a rear wheel contact load where the rear wheel is in contact with the ground.

However, in this known brake, a distribution ratio of hydraulic pressure for front and rear wheels is uniquely determined for an input hydraulic pressure (braking force) for the front wheel. Therefore, some operations may occur which are not preferred by a rider. The operations depend on a very limited environment for use of a vehicle, riding conditions, and the like. Hence, modifications by taking into account this problem are expected.

Since the above-described known brake system is uniquely determined in that the distribution ratio of hydraulic pressure for the front and rear wheels corresponds to an input hydraulic pressure for the front wheel, the distribution ratio of hydraulic pressure takes the same ratio, as shown in FIG. 13(b), not only when the braking force for the front wheel is increased, but also when the braking force for the front wheel is decreased. However, in the case where the front wheel is subjected to a braking force which is greater than a setting value, when the braking force for the front wheel is increased, the braking force for the rear wheel is gradually decreased along a characteristic slope. This means that when the braking force for the front wheel is decreased from this state, the braking force for the rear wheel is gradually increased along the same characteristic slope. For this reason, a rider who is used to riding a two-wheeled motor vehicle without CBS may be uncomfortable with the braking feel at the time of braking as described above.

SUMMARY OF THE INVENTION

In light of the above, in an illustrative embodiment thereof, the present invention provides a brake system for a two-wheeled motor vehicle which enables a rider to experience braking operations with less uncomfortable feeling.

A first aspect of the present invention provides a brake system for a two-wheeled motor vehicle, which is capable of synchronizing any one of braking operations for a front wheel and a rear wheel, with wheel braking means for the other wheel (for example, a brake caliper 4 in an embodiment), including: a controller (for example, a controller 9 in the embodiment) which electrically controls a braking force by each wheel braking means in response to a riding condition for a vehicle and a braking operation, and which includes a plurality of control modes which each has a different way of distributing a braking force to wheel braking means for the front wheel and to wheel braking means for the rear wheel; and mode selection switching means (for example, a mode selection switch 13 in the embodiment) for manually switching a control mode of the controller.

In such an arrangement, a rider can manually operate mode selection switching means according to an environment for use of the vehicle by a rider, riding conditions, and the like to switch a control mode of the controller as needed. Through this operation, for instance, it is possible to change an amount of braking operation-braking force distribution characteristic to a different one.

Furthermore, a second aspect of the present invention provides a brake system for a two-wheeled motor vehicle which is capable of synchronizing a braking operation on a front wheel with wheel braking means for a rear wheel. The brake system includes: a controller which electrically controls a braking force by each wheel braking means in response to a riding condition for a vehicle and a braking operation, in which, in the case where a braking operation for the front wheel is synchronized with the wheel braking means for the rear wheel, a braking force by the wheel braking means for the rear wheel is controlled by the controller to cause a braking force for the rear wheel to change from a gradual increase to a gradual decrease in response to an increment in a braking force for the front wheel, and to cause the braking force for the rear wheel to be maintained or gradually decreased in response to a decrease in the braking force for the front wheel.

In such a configuration, in the case where the wheel braking means for the rear wheel is synchronized with a braking operation for the front wheel, as the braking force for the front wheel is gradually increased, the braking force for the rear wheel is gradually increased at an early stage of the braking, thus enhancing the efficiency of braking. Meanwhile, at a later stage of the braking, the braking force for the rear wheel is gradually decreased, thereby coping with reduction of a rear wheel contact load, that is, the load generated by a contact between the rear wheel and the ground. In an inverse manner, when the braking force for the front wheel is decreased from this state, the braking force for the rear wheel is controlled to be maintained or gradually decreased in response to the decrement of the braking force for the front wheel.

A third aspect of the present invention provides a brake system for a two-wheeled motor vehicle which is capable of synchronizing a braking operation on a front wheel with wheel braking means for a rear wheel. The brake system includes a controller which electrically controls a braking force by each wheel braking means in response to a riding condition for a vehicle and a braking operation, in which, in the case where a braking operation for the front wheel is synchronized with the wheel braking means for the rear wheel, when an amount of braking operation for the front wheel increases from an amount thereof which is not greater than a predetermined one, the controller controls the wheel braking means for the rear wheel to cause a braking force for the rear wheel to change from a gradual increase to a gradual decrease in response to an increase in the amount of braking operation for the front wheel. Once the braking operation enters an operation area in which the braking force for the rear wheel is gradually decreased at a time of increase in the amount of braking operation for the front wheel, when the amount of braking operation for the front wheel decreases after entering the operation area, a control by the controller is changed to a braking release mode in which the braking force for the rear wheel at a time where the amount of braking operation for the front wheel is at a maximum value is retained constant.

In such a configuration, in the case where the braking operation for the front wheel is synchronized with the wheel braking means for the rear wheel, when the amount of braking operation for the front wheel increases from an amount thereof which is not greater than a predetermined one, the controller causes a braking force for the rear wheel to change from a gradual increase to a gradual decrease in response to an increase in the amount of braking operation for the front wheel. When a control by the controller is changed to the braking release mode, even if the amount of braking operation for the front wheel is decreased, the braking force for the rear wheel at the time where the amount of braking operation for the front wheel is at a maximum value is retained constant.

A fourth second aspect of the present invention provides a brake system for a two-wheeled motor vehicle which includes the features of the third aspect, and in which, after the control is changed to the braking release mode by the controller, the braking release mode is returned to a basic mode according to a reset condition. The reset condition is such that the amount of braking operation for the front wheel decreases down to an amount of braking operation where the braking force for the rear wheel in the braking release mode agrees with that in the basic mode.

In this case, when the control is once changed to the braking release mode, since the control does not return to the basic mode until the amount of braking operation for the front wheel decreases down to an amount of braking operation where the braking force for the rear wheel in the braking release mode agrees with that in the basic mode, the braking force for the rear wheel does not increase even if the degree of gripping of a brake for the front wheel is increased in the middle of braking.

A fifth aspect of the present invention provides a brake system for a two-wheeled motor vehicle which includes the features of the fourth aspect and/or the third aspect, and in which after the control is changed to the braking release mode by the controller, when the amount of braking operation for the front wheel increases going beyond the maximum value, the controller gradually decreases the braking force for the rear wheel in response to an increase in the amount of braking operation for the front wheel. Thereafter, when the amount of braking operation for the front wheel decreases, the braking force for the rear wheel at a time where the maximum value of the amount of braking operation for the front wheel is updated is retained constant.

In this case, after the control is once changed to the braking release mode, when the amount of braking operation for the front wheel increases going beyond the first maximum value through increase in the degree of gripping of the brake for the front wheel, the controller gradually decreases the braking force for the rear wheel in response to an increase of the amount of braking operation for the front wheel. Then, when the amount of braking operation for the front wheel is decreased, the controller continues retaining the braking force for the rear wheel at a low value at a time where the maximum value of the amount of braking operation is updated.

A sixth aspect of the present invention provides a brake system for a two-wheeled motor vehicle which is capable of synchronizing a braking operation on a front wheel with wheel braking means for a rear wheel. The brake system includes a controller which electrically controls a braking force by each wheel braking means in response to a riding condition for a vehicle and a braking operation, in which, in the case where a braking operation for the front wheel is synchronized with the wheel braking means for the rear wheel, when an amount of braking operation for the front wheel increases from an amount thereof which is not greater than a predetermined one, the controller controls the wheel braking means for the rear wheel to cause a braking force for the rear wheel to change from a gradual increase to a gradual decrease in response to an increase in the amount of braking operation for the front wheel. Once the braking operation enters an operation area in which the braking force for the rear wheel is gradually decreased at a time of increase in the amount of braking operation for the front wheel, when the amount of braking operation for the front wheel decreases after entering the operation area, a control by the controller is changed to a braking release mode in which the braking force for the rear wheel is gradually decreased from the braking force for the rear wheel at a time where the amount of braking operation for the front wheel is at a maximum value.

In such a configuration, under the circumstance where the braking operation for the front wheel is synchronized with the wheel braking means for the rear wheel, when the amount of braking operation for the front wheel increases from an amount thereof which is not greater than a predetermined one, the controller causes a braking force for the rear wheel to change from a gradual increase to a gradual decrease in response to an increase in the amount of braking operation for the front wheel. When a control by the controller is changed to the braking release mode, as the amount of braking operation for the front wheel decreases, the braking force for the rear wheel gradually decreases from the braking force at a time where the amount of braking operation for the front wheel is at a maximum value.

A seventh aspect of the present invention provides a brake system for a two-wheeled motor vehicle which includes the features of the sixth aspect, and in which the braking release mode is such that, when the amount of braking operation for the front wheel becomes one that is not greater than the amount of braking operation where the braking force for the rear wheel reaches a lower limit of a braking force, due to a gradual decrease of a braking force, the braking force for the rear wheel is retained as the lower limit of the braking force.

An eighth aspect of the present invention provides a brake system for a two-wheeled motor vehicle which includes the features of the sixth aspect and/or the seventh aspect, and in which, after the control is changed to the braking release mode by the controller, the braking release mode is returned to a basic mode according to a reset condition that the amount of braking operation for the front wheel decreases down to an amount of braking operation where the braking force for the rear wheel in the braking release mode agrees with that in the basic mode.

In this case, when the control is once changed to the braking release mode, since a control does not return to the basic mode until the amount of braking operation for the front wheel decreases down to an amount of braking operation where the braking force for the rear wheel in the braking release mode agrees with that in the basic mode, the braking force for the rear wheel does not rapidly increase even if the degree of gripping of a brake for the front wheel is increased in the middle of braking.

A ninth aspect of the present invention provides a brake system for a two-wheeled motor vehicle which includes of the features of any of the sixth, seventh or eighth aspects, and in which, after the control is changed to the braking release mode by the controller, when the amount of braking operation for the front wheel increases going beyond the maximum value, the controller gradually decreases the braking force for the rear wheel in response to an increase in the amount of braking operation for the front wheel, and, thereafter, when the amount of braking operation for the front wheel decreases, the braking force gradually decreases from the braking force for the rear wheel at a time where the maximum value of the amount of braking operation is updated.

In this case, after the control is once changed from the basic mode to the braking release mode, when the amount of braking operation for the front wheel increases going beyond the first maximum value by increasing the degree of gripping of the brake for the front wheel, the controller gradually decreases the braking force for the rear wheel in response to an increase in the amount of braking operation for the front wheel. Then, when the amount of braking operation for the front wheel gradually decreases, the controller gradually decreases the braking force for the rear wheel from a low braking force at a time where the amount of braking operation is updated.

According to the first aspect of the invention, a rider can manually change the control mode of the controller, as needed, corresponding to an environment for use of a vehicle, driving conditions, and the like, hence always enabling the rider to perform preferred braking operations.

According to the second aspect of the invention, when a braking operation for the front wheel is synchronized with the wheel braking means for the rear wheel, a control is performed so that the braking force for the rear wheel is retained, or gradually decreases in response to a decrease of the braking force for the front wheel, hence providing a braking operational feeling similar to that for a vehicle without CBS.

According to any one of the third through fifth aspects of the invention, in the case where a braking operation for the front wheel is synchronized with the wheel braking means for the rear wheel, when a control by the controller is changed to the braking release mode, the braking force for the rear wheel is retained constant in response to a decrease in the amount of braking operation for the front wheel, hence providing a braking operational feeling similar to that for a vehicle without CBS.

According to the fourth aspect of the invention, even if the degree of gripping of a brake for the front wheel is increased in the middle of braking after the control is changed to the braking release mode, the braking force for the rear wheel does not increase so long as the reset condition is not satisfied, hence preventing a change in braking feeling due to a sudden increase in the braking force for the rear wheel when the degree of gripping is increased.

According to the fifth aspect of the invention, after the control is changed to the braking release mode, in the case where the degree of gripping is increased in the middle of braking so that the amount of braking operation for the front wheel exceeds the first maximum value, the braking force for the rear wheel is retained at a low braking force at a time where the maximum value of the amount of braking operation for the front wheel is updated while the amount of the braking operation is decreased, hence preventing a change in braking feeling at a time of increasing the degree of gripping.

According to any one of the sixth through ninth aspects of the invention, in the case where a braking operation for the front wheel is synchronized with the wheel braking means for the rear wheel, when a control by the controller is changed to the braking release mode, the control is performed so as to gradually decrease the braking force for the rear wheel in response to a decrease in the amount of braking operation for the front wheel, hence providing a braking operational feeling similar to that for a vehicle without CBS.

According to the seventh aspect of the invention, after the control is changed to the braking release mode, in the case where the amount of braking operation becomes one which is not greater than a predetermined amount where the braking force for the rear wheel reaches a lower limit for the braking force, due to a gradual decrease of the braking force, the braking force for the rear wheel is retained at the lower limit for the braking force, thus preventing an increase in the braking force for the rear wheel at a time where the amount of braking operation decreases.

According to an eighth aspect of the invention, even if the degree of gripping of a brake for the front wheel is increased in the middle of braking after the control is changed to the braking release mode, the braking force for the rear wheel does not increase so long as the reset condition is not satisfied, hence preventing a change in braking feeling due to a sudden increase in the braking force for the rear wheel.

According to the ninth aspect of the invention, after the control is changed to the braking release mode, in the case where the degree of gripping of a brake for the front wheel is increased in the middle of braking so that the amount of braking operation for the front wheel exceeds the first maximum value, the braking force for the rear wheel is gradually decreased from a low braking force at a time where the maximum value of the amount of braking operation for the front wheel is updated while the amount of the braking operation is decreased, hence preventing a change in braking feeling at a time of increasing the degree of gripping.

For a more complete understanding of the present invention, the reader is referred to the following detailed description section, which should be read in conjunction with the accompanying drawings. Throughout the following drawings and description, like numbers refer to like parts. The above-mentioned object, other objects, characteristics and advantages of the present invention will become apparent form the detailed description of the embodiment of the invention presented below in conjunction with the attached drawings.

BRIEF DESCRIPTION OF THE DRAWINGS

FIG. 13(a) is a braking force distribution characteristic view for front and rear wheels when a braking operation is performed to a front wheel in the embodiment of FIG. 1.

FIG. 13(b) is a braking force distribution characteristic view for front and rear wheels when a braking operation is performed to a front wheel in a prior art braking system.

DETAILED DESCRIPTION

Figure 1:
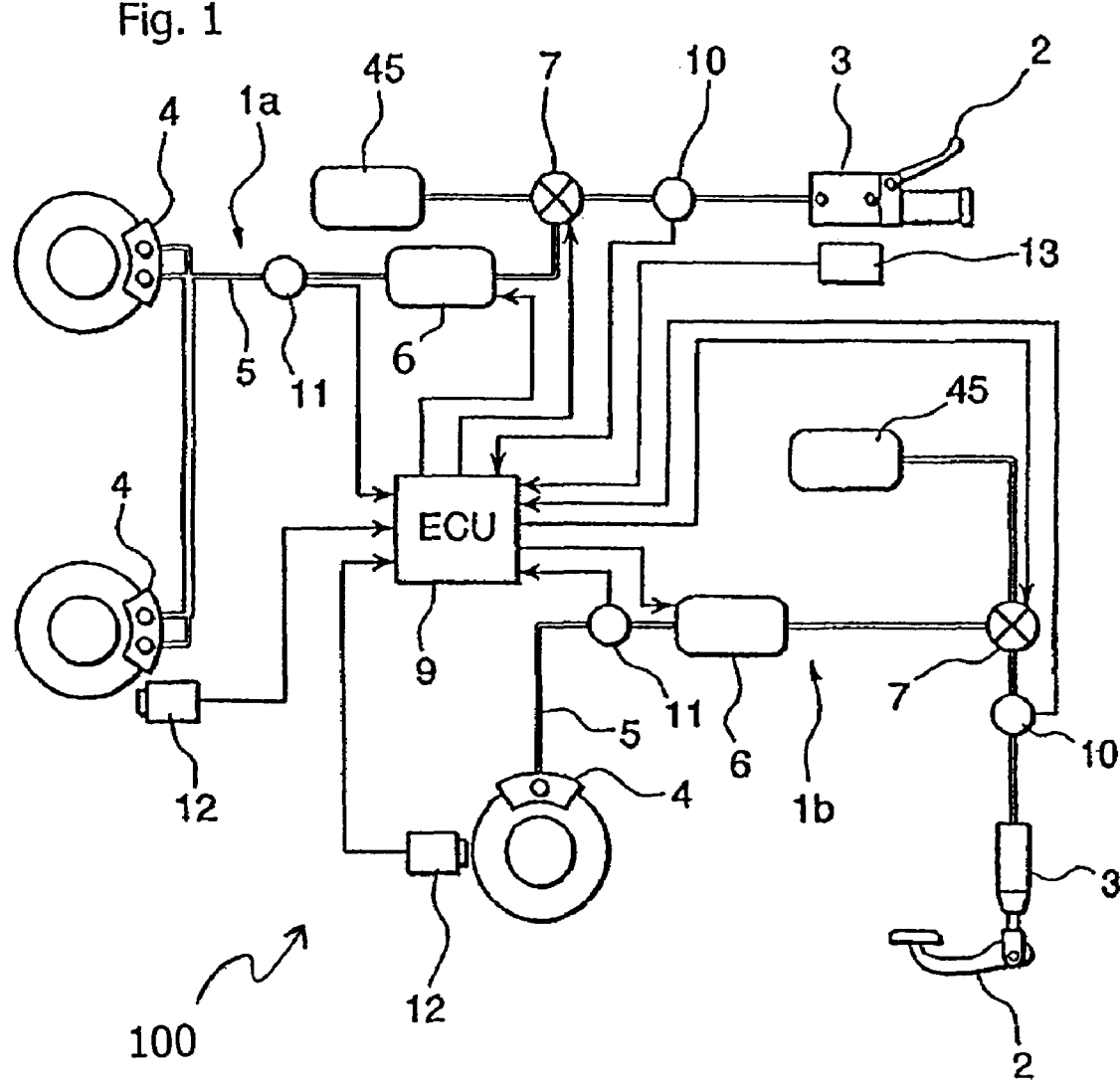
FIG. 1 is a schematic view of the combined brake system showing an embodiment of the present invention.
Figure 2:
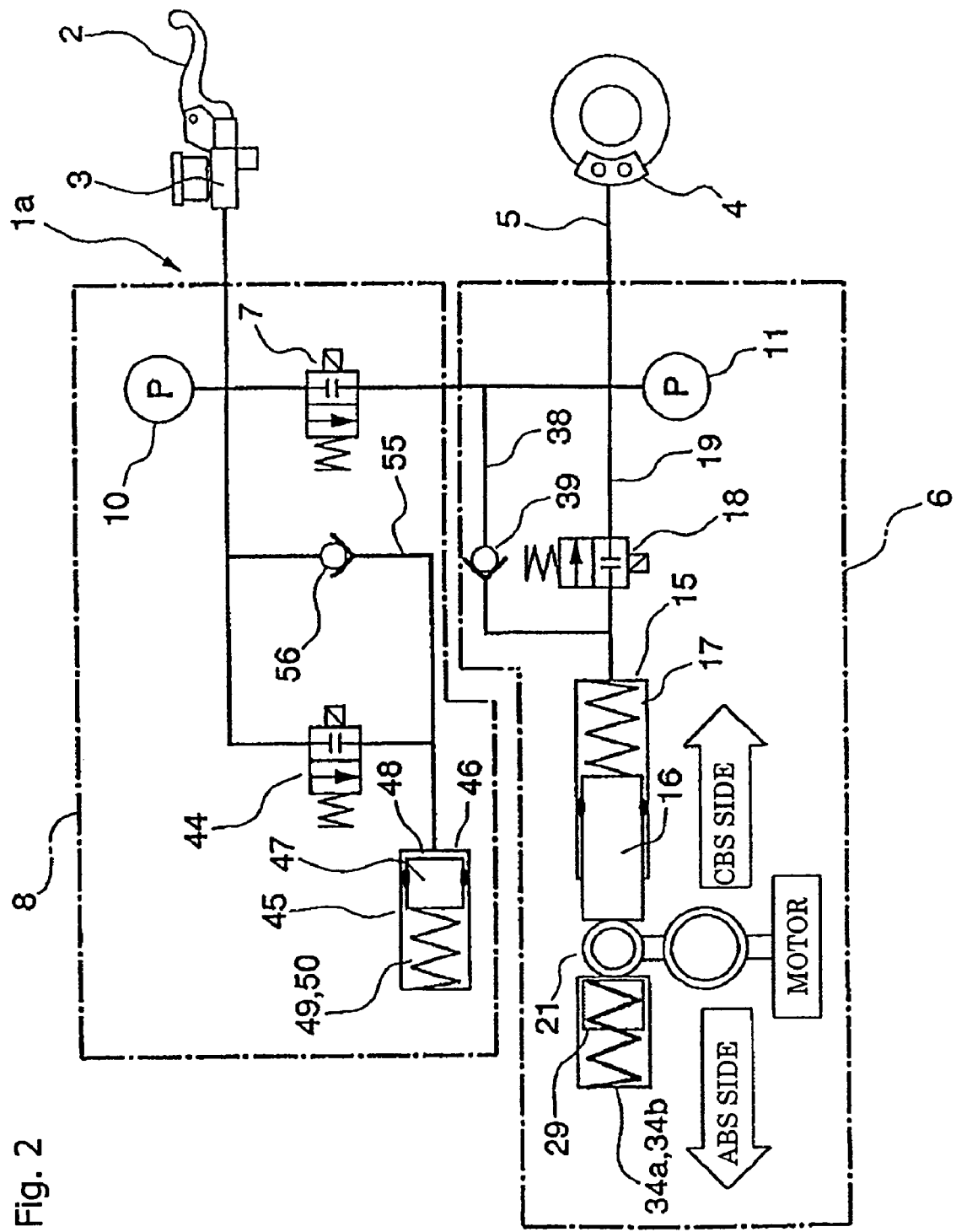
FIG. 2 is a schematic view of a braking circuit at a front wheel for the embodiment of FIG. 1.

Next, an embodiment of the present invention is described with reference to the drawings. FIG. 1 is a simplified schematic view of a combined brake system 100 according to a selected illustrative embodiment of the present invention, showing the system configuration as a whole. This brake system 100 includes a front brake circuit 1a at a front wheel and a rear brake circuit 1b at a rear wheel, in which each of the circuits is independent of the other circuit. In the brake circuits 1a, 1b at the front and rear wheels of the system 100 according to this embodiment, although there are differences between the two circuits, in that a brake operation lever 2 at the front wheel is provided as a hand-operable lever while that at the rear wheel is a foot pedal, all the other basic constituents are substantially the same. Thus, only a specific description of the circuit arrangement for the front brake circuit 1a will be described in detail. For the rear brake circuit 1b, components which are the same as those in the circuit 1a are denoted by the same reference numerals, and redundant description will be omitted.

In each of the brake circuits 1a and 1b, a master cylinder 3 and a brake caliper 4 are connected through a main brake passage 5. The master cylinder 3 is activated by the brake operation lever 2, while the caliper serves as a wheel braking mechanism corresponding to the master cylinder 3. A hydraulic pressure modulator 6, which generates hydraulic pressure using an electrically-operated actuator (to be described later), is medially connected to the main brake passage 5 in the middle thereof. A first electromagnetic on-off valve 7 is provided in the circuit 1a at a position closer to the master cylinder 3 than to the part connecting the hydraulic pressure modulator 6 with the main brake passage 5. The first electromagnetic on-off valve 7 is normally open, and allows fluid communication between the master cylinder 3 and the brake caliper 4. When closed, the first electromagnetic on-off valve 7 interrupts fluid communication between the master cylinder 3 and the brake caliper 4. The circuit 1a also includes a hydraulic loss simulator 45 which is connected to the first electromagnetic on-off valve 7. The hydraulic loss simulator 45 is operable to apply a pseudo-hydraulic force, as needed, to the master cylinder 3, in response to a braking operation amount sensed at the brake operation lever 2 when the electromagnetic on-off valve 7 closes the main brake passage 5. The electrically-operated actuator of the hydraulic pressure modulator 6 and the first electromagnetic on-off valve 7, respectively, are electrically controlled by the controller (ECU) 9, along with valves and the like incorporated in the hydraulic pressure modulator 6 and the like.

The following components are operatively connected to the ECU 9: pressure sensors 10 and 11 for detecting hydraulic pressures at a position close to an input side (at a position close to the master cylinder 3 across the first electromagnetic on-off valve 7) and at a position close to an output side (at a position close to the brake caliper 4 across the first electromagnetic on-off valve 7) in each of the brake circuits 1a and 1b; a wheel speed sensor 12 in each circuit 1a, 1b for detecting the speed of each of the front and rear wheels, respectively; a manually operable mode selection switch 13 (mode selection switch) with which a rider manually changes a control mode; and the like. The controller 9 controls a braking pressure at the brake caliper 4 in response to input signals, or signals for the mode change, generated in the above operations.

The brake system 100 according to the illustrated embodiment includes a combined brake system (CBS) which operates the other brake caliper 4 in a synchronized manner, when a brake operation lever 2 for either of the front and rear wheels is performed. The brake caliper 4 in the CBS is operated under pressure supplied from the hydraulic pressure modulator 6 by way of by-wire. That is, when a brake operation lever 2 is depressed, information such as the speeds of the front and rear wheels, and the amount of pressure applied in braking are inputted into the controller 9 through various kinds of sensors. At this time, the first electromagnetic on-off valves 7 in both brake circuits close the main brake passages 5 in response to an instruction from the controller 9, and the hydraulic pressure modulators 6 simultaneously supply hydraulic pressures to the respective brake calipers 4 according to riding conditions of a vehicle and a braking operation. However, supplying of the hydraulic pressure from the hydraulic pressure modulator 6 to the circuit for the side where a brake operation is not performed is limited only when the mode selection switch 13 is set in a mode allowing the CBS, as will be described later.

Since the first electromagnetic on-off valve 7, which is provided in the middle of the main brake passage 5, is normally open, when it is held non-energized while a vehicle is in a driving mode or the like, power consumption by the vehicle can be reduced. Meanwhile, all the above-description is for a case where a braking operation is performed for a short period of time. The brake system is configured to be shifted into a mode in which power consumption is reduced when a braking operation is performed for a long period of time, such as for example, on a downwardly extending slope. A mode for minimizing power consumption will be described later.

Subsequently, the structure and function of the hydraulic pressure modulator 6 will be described, with reference to FIGS. 2 to 10.

Figure 3:
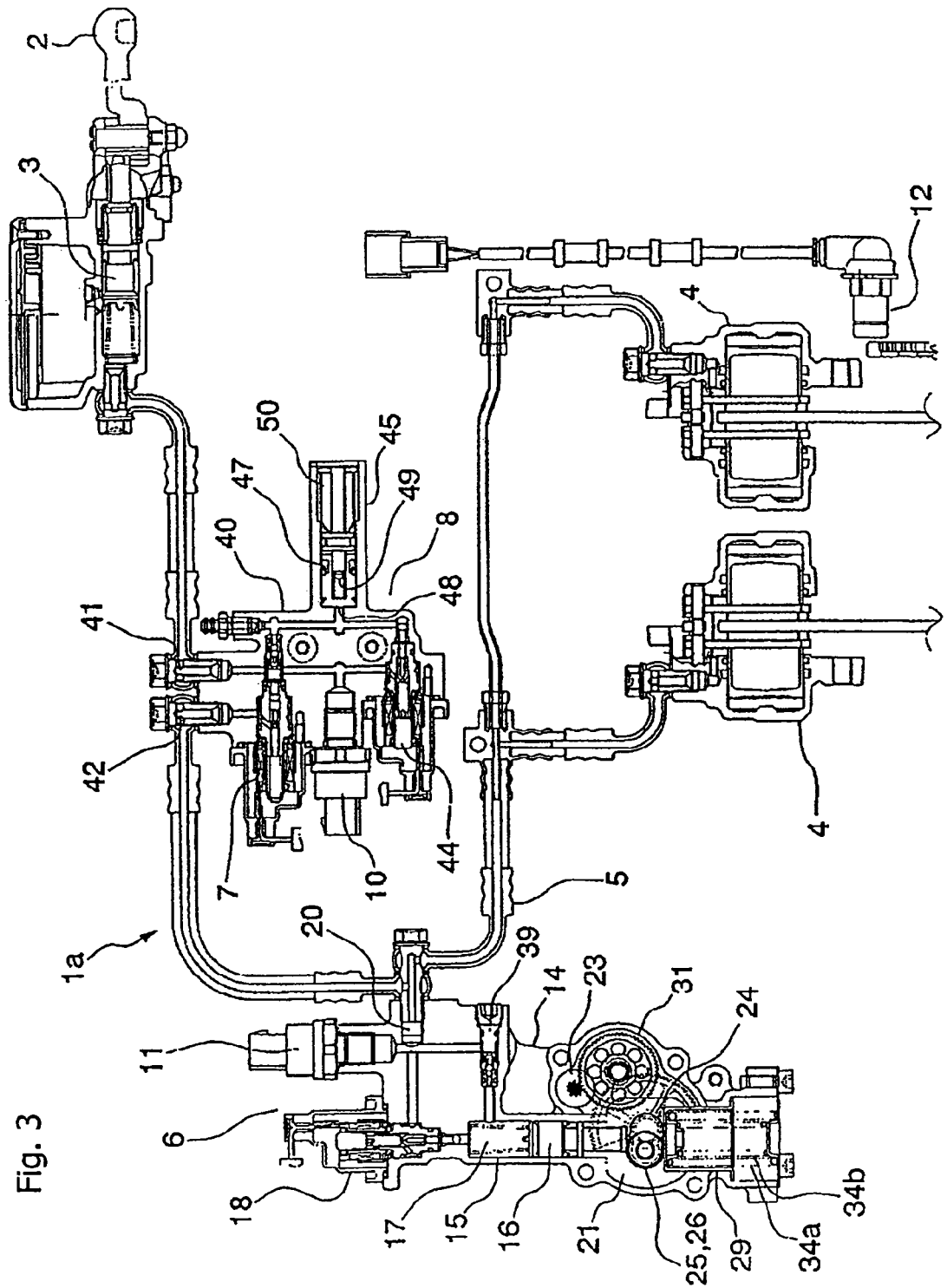
FIG. 3 is a diagram of a braking circuit at a front wheel for the embodiment of FIG. 1 showing hydraulic fluid pathways between braking system components.
Figure 4:
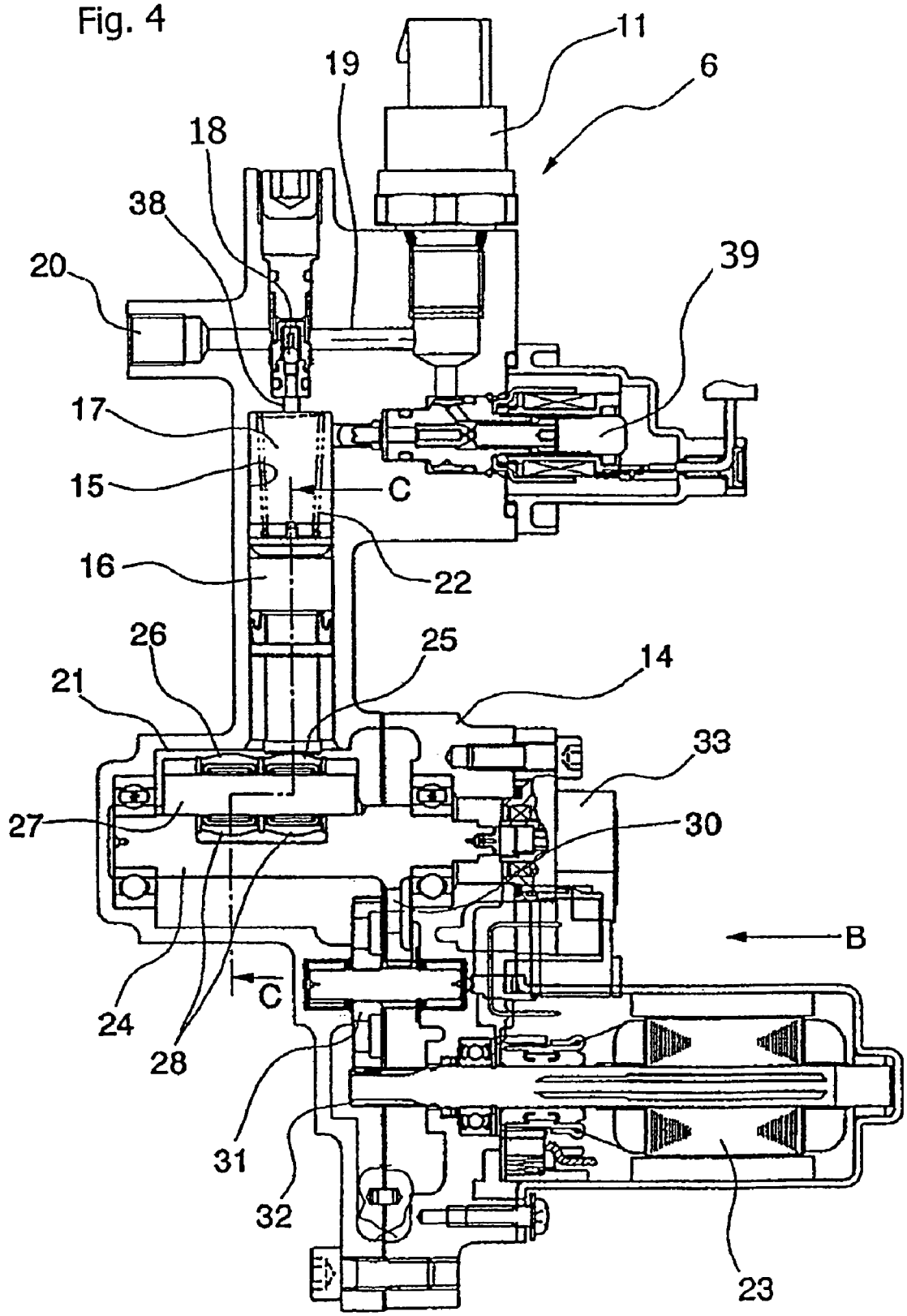
FIG. 4 is an enlarged sectional view of the hydraulic pressure modulator taken along the dashed line A-A in FIG. 5 showing the piston in a neutral position within the hydraulic pressure chamber.
Figure 5:
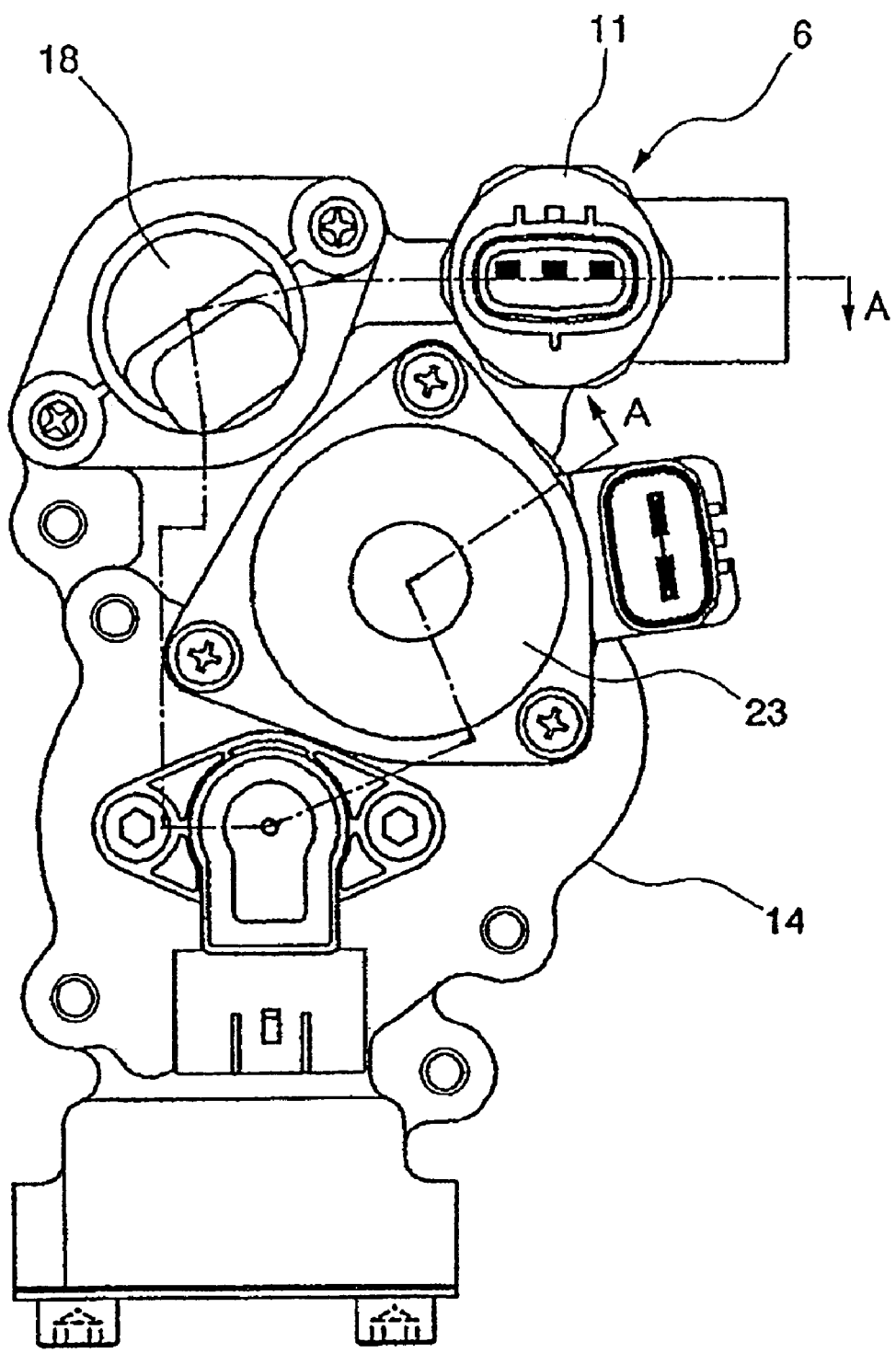
FIG. 5 is a side view of the hydraulic pressure modulator as is seen from the direction of the arrow B in FIG. 4 showing the third electromagnetic on-off valve, the pressure sensor, and the motor lying in parallel.
Figure 9:
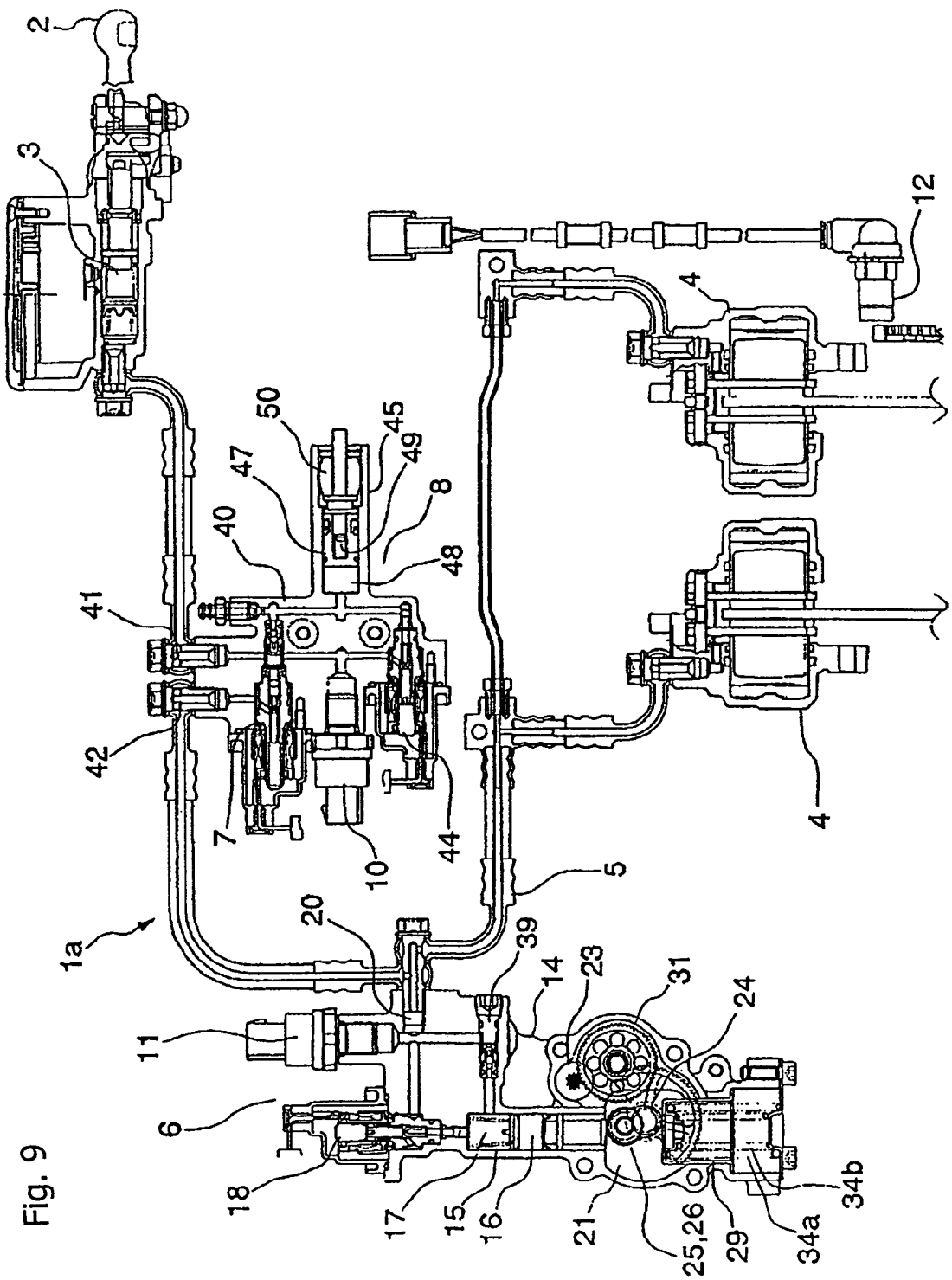
FIG. 9 is a diagram of a braking circuit at a front wheel for the embodiment of FIG. 1 showing hydraulic fluid pathways between braking system components for the braking system in a CBS operation.
Figure 10:
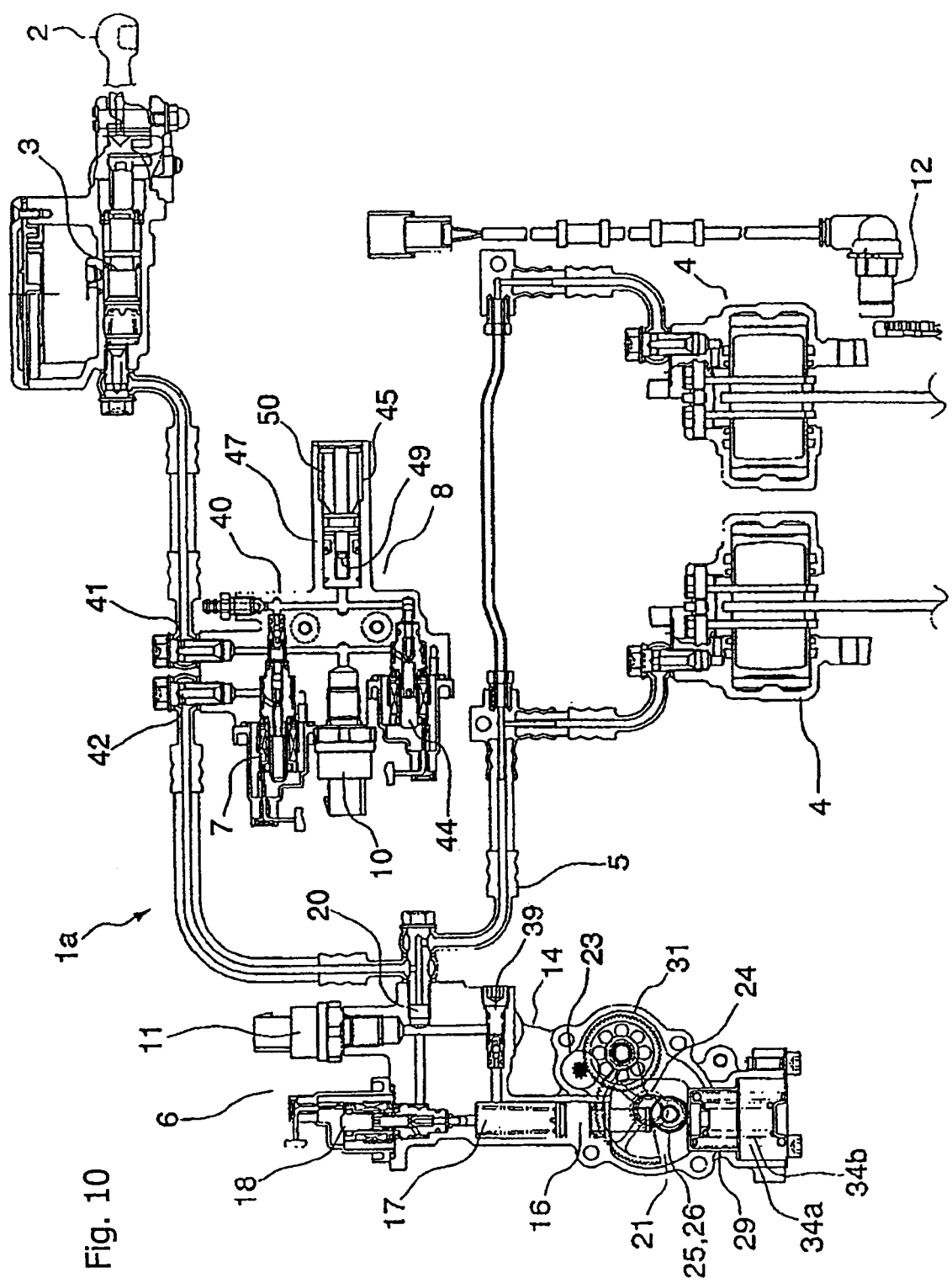
FIG. 10 is a diagram of a braking circuit at a front wheel for the embodiment of FIG. 1 showing hydraulic fluid pathways between braking system components for the braking system in an ABS operation.

In the hydraulic pressure modulator 6, as shown in FIG. 4 in an enlarged cross-section thereof, a piston 16 is housed in, and freely moves in the forward and backward directions, in a cylinder 15 formed in a modulator body 14. A hydraulic pressure chamber 17 is formed between the cylinder 15 and the piston 16. The hydraulic pressure chamber 17 is connected to an output port 20 of the modulator body 14 via a main supply-and-discharge passage 19, with a second electromagnetic on-off valve 18 intervening. The output port 20 is connected to the main brake passage 5 as shown in FIGS. 3, 9, and 10, so that hydraulic fluid or similar liquid for operation is supplied or discharged, as needed, between the hydraulic pressure chamber 17 and the main brake passage 5. While internal passages, each of which is connected to the main brake passage 5 from the hydraulic pressure chamber 17, are drawn differently between the hydraulic pressure modulator 6 shown in FIG. 4 and the hydraulic pressure modulator 6 shown in FIGS. 3, 9, and 10, the differences are only due to a matter of convenience in drawings, and there are minimal or no differences in the structure and functions between them.

The hydraulic pressure modulator 6 includes: a cam mechanism 21 for pushing up the piston 16 toward the hydraulic pressure chamber 17 as shown FIG. 4; a return spring 22 which constantly keeps pressing the piston 16 toward the cam mechanism 21; and an electrically operated motor 23, serving as an electrically-operated actuator to activate the cam mechanism 21. The electrically-operated motor 23 is controlled by the controller 9 (refer to FIG. 1) to rotate in forward and reverse directions as needed.

In the cam mechanism 21, cam rollers 25 and 26 are provided on a camshaft 24 which is bearing-supported in the modulator body 14, in a manner such that the cam rollers 25 and 26 are eccentrically located from the center of rotation of the camshaft 24. The cam rollers 25 and 26 are rotatably supported on a common shaft 27, which is provided on an outer circumference of the camshaft 24 in parallel thereto, with a roller bearing 28 interposed therebetween. Accordingly, both cam rollers 25 and 26 are provided in a series on the outer circumference of the camshaft 24. Meanwhile, an end of the piston 16, which is energized by the return spring 22, constantly abuts the cam roller 25, while a lifter 29 abuts the other cam roller 26, as will be described later.

On an end of the camshaft 24, a sector gear 30 is provided in aggregation. The sector gear 30 is engaged with a pinion gear 32 on an output shaft of the electrically-operated motor 23 through engagement of a speed reducing gear 31 (refer to FIG. 4 and FIG. 6(*b*)). Accordingly, a rotational torque of the electrically-operated motor 23 is transmitted to the camshaft 24 through engagements of these gears, and a rotation of the camshaft 24 produced by the torque is transmitted to the piston 16 as an operational force, via the cam roller 25. Further, on an end of the camshaft 24, an angle sensor 33 is provided, and angle information on the camshaft 24, detected with the angle sensor 33, is fed back to the controller 9.

Figure 6A:
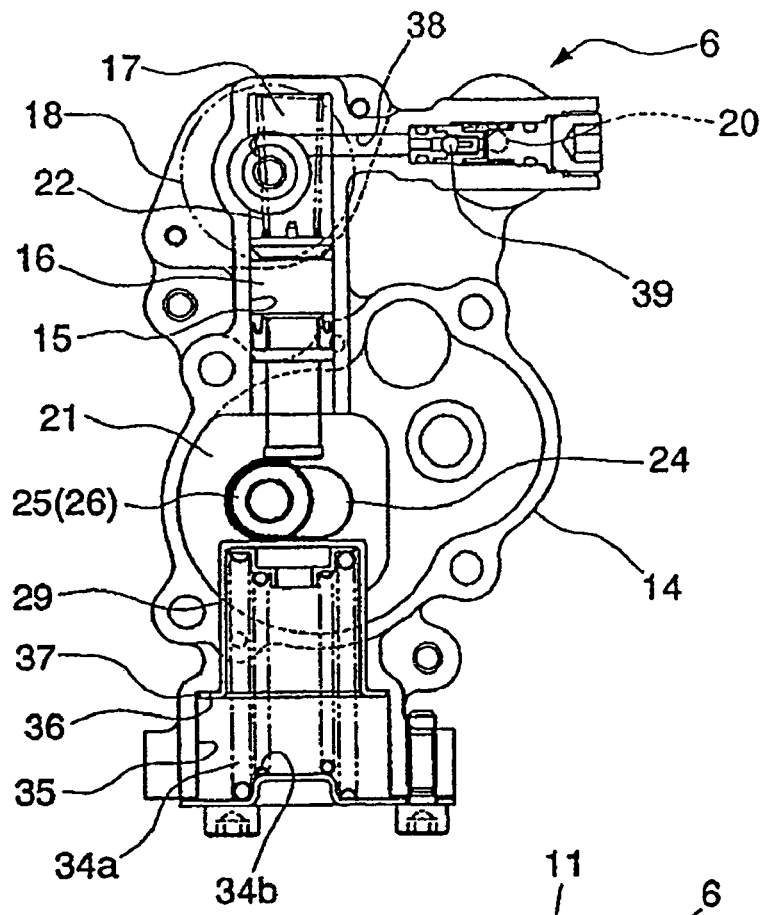
FIG. 6(a) is a sectional view of the hydraulic pressure modulator taken along the dashed line C-C in FIG. 4, which is not in operation, showing the piston in the neutral position.
Figure 6B:
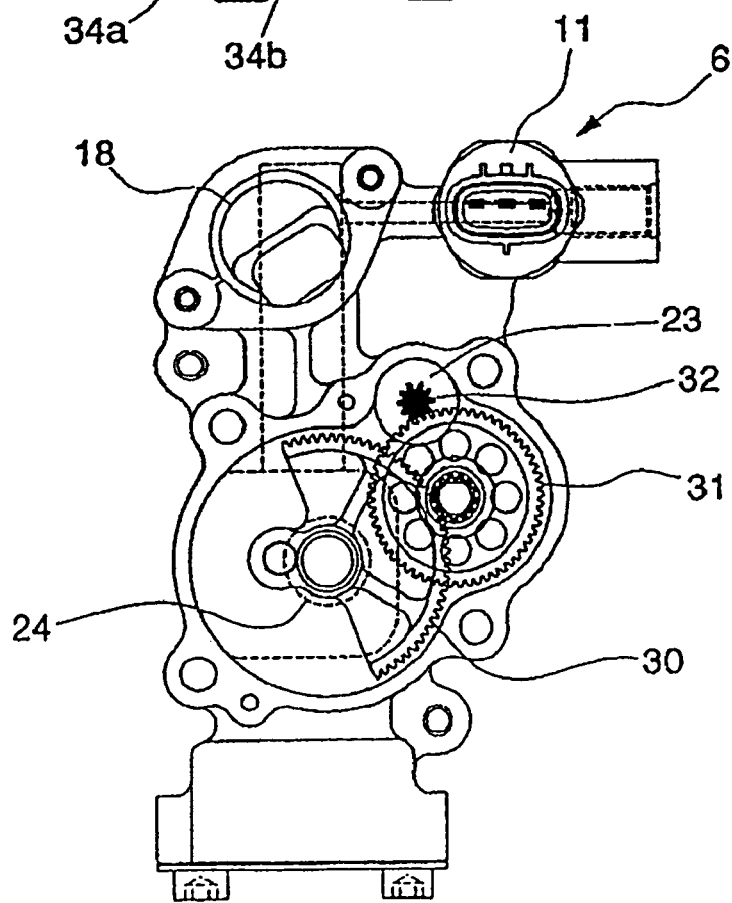
FIG. 6(b) is a side view of the hydraulic pressure modulator of FIG. 6(a) as seen from the direction of the arrow B in FIG. 4, showing a transmission part of an electrically-operated motor.
Figures 7A, 7B:
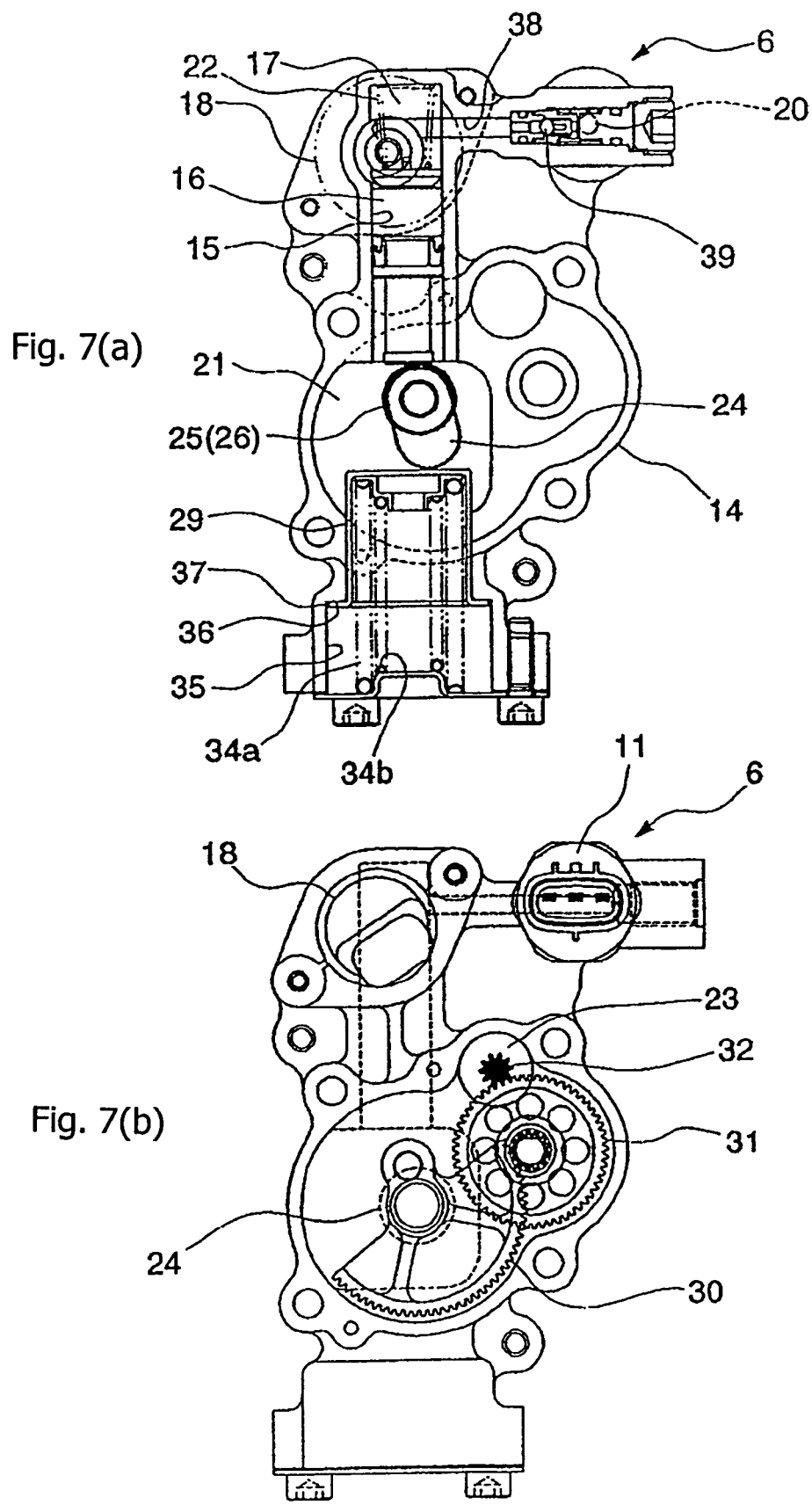
FIG. 7(a) is a sectional view of the hydraulic pressure modulator taken along the dashed line C-C in FIG. 4, showing the hydraulic pressure chamber reduced in sized due to the upward movement of the piston as found when the braking system is under CBS control.
FIG. 7(b) is a side view of the hydraulic pressure modulator of FIG. 7(a) as seen from the direction of the arrow B in FIG. 4, showing a transmission part of an electrically-operated motor.
Figure 8A:
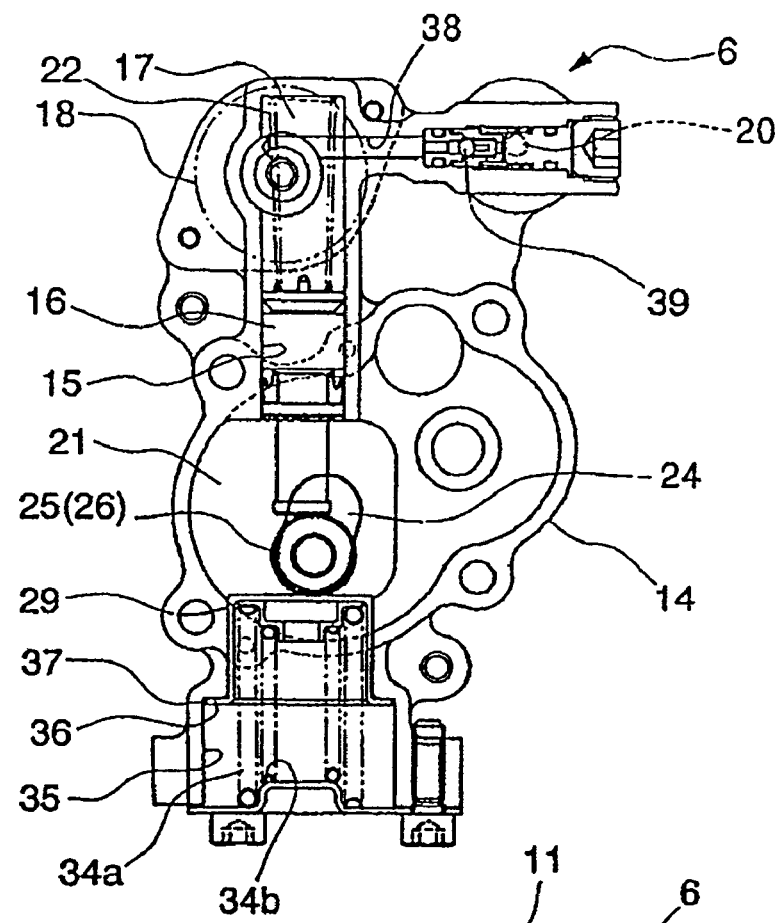
FIG. 8(a) is a sectional view of the hydraulic pressure modulator taken along the dashed line C-C in FIG. 4, showing the hydraulic pressure chamber expanded in sized due to the downward movement of the piston as found when the braking system is under ABS control.
Figure 8B:
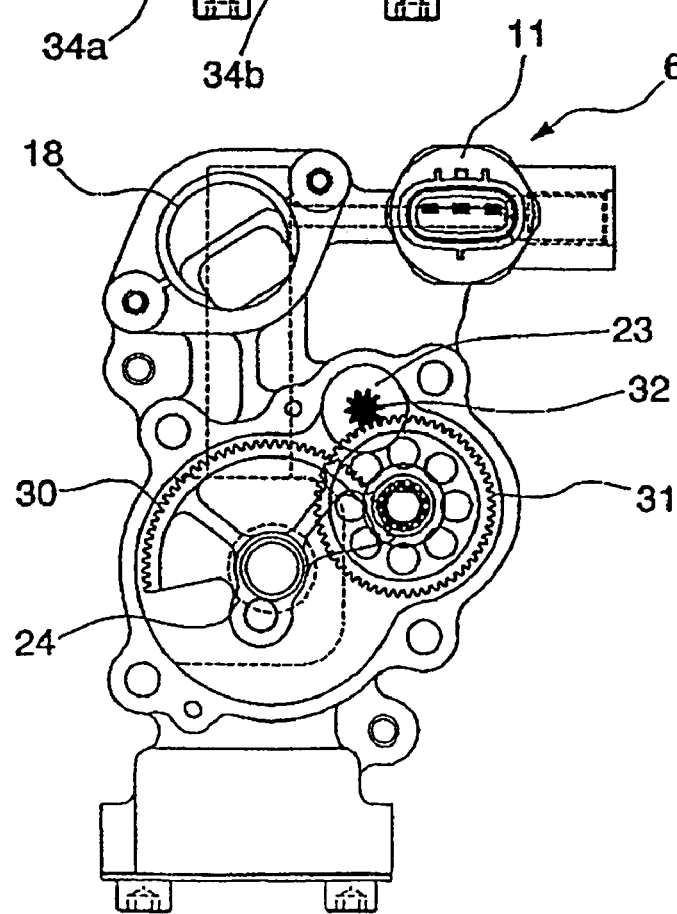
FIG. 8(b) is a side view of the hydraulic pressure modulator of FIG. 8(a) as seen from the direction of the arrow B in FIG. 4, showing a transmission part of an electrically-operated motor.

The piston 16 is operationally controlled in two separate regions inside the cylinder 15, which are separated from each other with respect to a neutral reference position. The neutral reference position is located approximately at the center of the cylinder 15. FIGS. 3, 4, 6(*a*), and 6(*b*) show a state where the piston 16 is at the neutral reference position, and in this state an eccentric position of the cam roller 25 on the camshaft 24 is substantially orthogonal to the direction of the stroke for the piston 16. The electrically-operated motor 23 moves the eccentric position of the cam controller 25 in an upward direction or a downward direction in a rotational manner in the drawings as needed.

In the hydraulic pressure modulator 6 of this embodiment, a region (a lower portion in FIG. 4) at the side where the hydraulic pressure chamber 17 is expanded relative to the neutral reference position, is used for an antilock braking system (ABS) control, while the other region, (an upper portion in FIG. 4) at the side where the hydraulic pressure chamber 17 is reduced in size, is used for a CBS control. The ABS controls hydraulic pressure to reduce and retain hydraulic pressure, and then increase it again to the main brake passage 5 (brake caliper 4). It is therefore preferable for control to use the region at the side where the hydraulic pressure chamber 17 is expanded under an action of the piston to be moved away from the neutral reference position. The CBS acts to positively supply an operation liquid to the main brake passage (brake caliper). Therefore, it is preferable for control of the above to use the region at the side where the hydraulic pressure chamber 17 is reduced in size under a movement of the piston from the neutral reference position. In addition, FIGS. 7(*a*), 7(*b*) and 9 show a state under the CBS control while FIGS. 8(*a*), 8(*b*), and 10 show a state under the ABS control.

Accordingly, in the hydraulic pressure modulator 6, the piston 16 is used in the non-centered regions for the ABS and CBS, respectively, by setting an approximate center position of the cylinder 15 as the neutral reference position. Thus, providing separate pistons for the ABS and CBS, for a total of two pistons, is not necessary. For this reason, in the hydraulic pressure modulator 6, a reduction in the number of components and a reduction in size and weight are provided.

As seen in FIGS. 3, 6(*a*) and 7(*a*), a lifter 29 is provided at a position below the other cam roller 26 of the hydraulic pressure modulator 6. The lifter 29 is cylindrical in shape, and the base thereof is provided in a manner such that it is freely movable in the forward and backward directions. The lifter 29 is energized in the direction of the cam roller 26 by a pair of backup springs 34*a* and 34*b* that are disposed in a nested manner. The lifter 29 is disposed in a stepped-housing hole 35 formed in the modulator body 14, and a stopper flange 37, which can abut a stepped-surface of the housing hole 35, is integrally formed as a skirt extending outwardly on the lower periphery of the opening of the lifter 29. This stopper flange 37 constitutes a stopper, which defines an energized position for the piston 16, due to the actions of the backup springs 34*a* and 34*b*, along with the surfaces of the housing holes 35. This stopper (stopper flange 37 and stepped-surface 36) defines a maximum energized position for the piston 16 as the neutral reference position, due to the actions of the backup springs 34*a* and 34*b*.

The backup springs 34*a* and 34*b* energize the piston 16 in the direction in which the hydraulic pressure chamber is reduced in size. An energized force against the piston 16 is mainly effective when the electrically-operated motor 23 is not energized. However, in the state where a torque produced by the electrically-operated motor 23 is not applied, the piston is returned to the neutral reference position where the stopper works. In addition, with respect to spring forces of the backup springs 34*a* and 34*b* and the return spring 22, those of the backup springs 34*a* and 34*b* are larger when the piston is at the neutral reference position. The piston 16 is constantly subjected to the spring forces of the backup springs 34*a* and 34*b* and the return spring 22, in a manner that the piston 16 returns to the neutral reference position.

A bypass passage 38 is provided in the modulator body 14, which connects the hydraulic pressure chamber 17 and the output port 20, bypassing the second electromagnetic on-off valve 18. This bypass passage 38 includes a check valve 39 which allows flowing of operation liquid to the output port from the hydraulic pressure chamber 17.

The second electromagnetic on-off valve 18 in the main supply-and-discharge passage 19 is normally closed, and is caused to be open by energizing only when operation liquid is supplied from the hydraulic pressure modulator 6 to the brake caliper 4 under the ABS control and CBS control. However, even under such conditions, when the second electromagnetic on-off valve 18 comes to a state where it is not energized due to some cause, the main supply-and-discharge passage 19 is automatically closed. In this brake system, even when the second electromagnetic on-off valve 18 is closed, flow of the operation liquid from the hydraulic pressure chamber 17 to the main brake passage 5 is secured by the bypass passage 38 and the check valve 39.

Furthermore, in this brake system, the pressure sensor 11, which detects the pressure of liquid at the output side in each of the brake circuits, is fixed in the modulator body 14 of the hydraulic pressure modulator 6. A sensor-detecting portion is disposed so as to be exposed to an upper portion (a portion at the side where the output port 20 is present) which is away from the second electromagnetic on-off valve 18 in the main supply-and-discharge passage 19 in the modulator body 14. Therefore, in this brake system, the pressure sensor 11 can be compactly provided in a block form in such a manner that the pressure sensor is integral with the hydraulic pressure modulator 6. The pressure sensor 11 can also detect a hydraulic pressure at the output side in the brake circuit and at a position in proximity to the brake caliper 4.

Moreover, in the hydraulic pressure modulator of this embodiment, as shown in FIGS. 5 to 8, the pressure sensor 11, which is a long and slender functional component, the electrically-operated motor 23, and the second electromagnetic on-off valve 18 are fixed to the modulator body 14 in such a manner that all of them are in parallel. Therefore, the hydraulic pressure modulator 6 as a whole becomes compact, hence being advantageous for mounting it on a vehicle.

Figure 11:
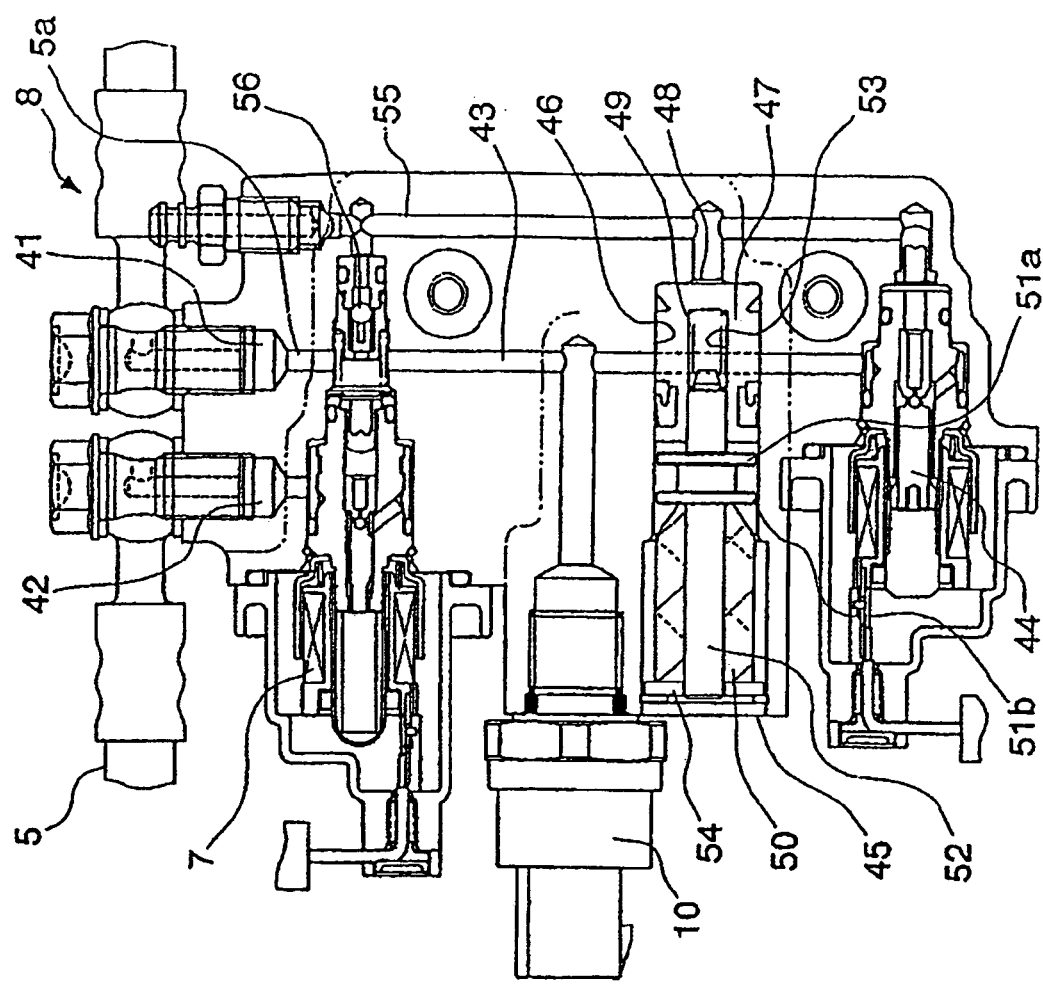
FIG. 11 is a sectional view of a reaction force modulator of the embodiment of FIG. 1.
Figure 12:
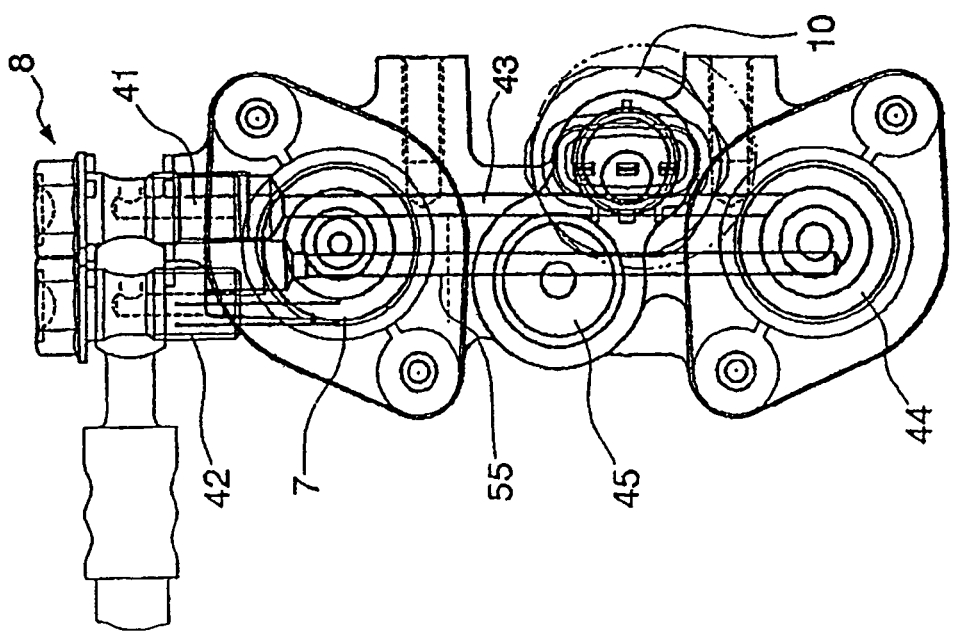
FIG. 12 is a passage arrangement view for the reaction force modulator of FIG. 11 as seen from the direction perpendicular to the section in FIG. 11.

Next, the structure of the hydraulic loss simulator 45 will be described with reference to FIGS. 11 and 12. While the structures shown in FIGS. 11 and 12 are drawn differently in constituent components, orientations thereof and the like from those shown in FIGS. 3, 9, and 10, the differences are only due to a matter of convenience in drawings.

The hydraulic loss simulator 45 is incorporated in a block-like passage switching unit 8. A main brake constituent passage 5*a* is formed in a unit body 40 for the passage switching unit 8, as a part of the main brake passage 5. Two ends of the main brake constituent passage 5*a* are respectively connected to an input port 41 communicated with the master cylinder 3 and an output port 42 communicated with the brake caliper 4. The first electromagnetic on-off valve 7 of normally open is integrally fixed to the unit body 40, and an on-off operation portion of the first electromagnetic on-off valve 7 works to open or close the main brake constituent passage 5*a*.

There is a branched passage 43 at an upper position (a position at the side where the master cylinder 3 is present) away from the first electromagnetic on-off valve 7 in the main brake constituent passage 5*a*. The hydraulic loss simulator 45 is connected to the branched passage 43 via a third electromagnetic on-off valve 44 which is normally closed. The third electromagnetic on-off valve 44 is controlled, by energizing, with the controller 9 as in the case of the first electromagnetic on-off valve 7, and works, under a CBS control, so as to allow communication between the master cylinder 3 and the hydraulic loss simulator 45 via the brake passage. At this time, the first electromagnetic on-off valve 7 closes, by energizing, the main brake constituent passage 5*a*.

There is a pressure sensor 10 for an input side in the brake circuit at an upper position (a position at the side where the input port 41 is present) which is away from the electromagnetic on-off valve 44 on the branched passage 43. This pressure sensor 10 is integrally fixed to the unit body 40 so that a pressure sensor portion thereof is disposed in the branched passage. An upper portion away from the third electromagnetic on-off valve 44 on the branched passage 43 constantly communicates with the input port 41 regardless of on or off of the first electromagnetic on-off valve 7 of normally open, thus allowing the pressure sensor 10 to accurately and constantly detect a pressure in the vicinity of the master cylinder 3 in the circuit.

Meanwhile, in the hydraulic loss simulator 45, a piston 47 is housed in a cylinder 46 formed in the unit body 40, and is freely movable in the forward and backward directions within the cylinder 46. A liquid chamber 48 is formed between the cylinder 46 and the piston 47 to receive operation liquid flowing from the master cylinder 3. On the back of the piston 47, a coil spring 49 made of metal and a deformed resin spring 50 are provided in series, and the piston 47 is subjected to reaction forces generated by these two springs 49 and 50 (elastic members) which are different in characteristics from each other.

Furthermore, on the back of the piston 47 in the cylinder 46, a guide rod 52 is provided, which has a pair of flanges 51*a* and 51*b* located at approximately the center of the cylinder along the axis. An end of the guide rod 52 is inserted into a housing hole 53 formed at the center of the back of the piston 47, and the other end thereof is passed through the axis center of the deformed resin spring 50. The coil spring 49 is disposed between the housing hole 53 for the piston 47 and an end of the guide rod 52 so as to generate a reaction force corresponding to a stroke before the back of the piston 47 abuts the flange 51*a* of the guide rod 52. Meanwhile, the deformed resin spring 50 is disposed between a thrust washer 54 provided at the base of the cylinder 46 and the other flange 51*b* of the guide rod 52. The deformed resin spring 50 comes into a deformed state in response to a backward stroke of the guide rod 52 such that a reaction force and a damping resistance (internal friction resistance) associated with the deformation are generated. In addition, the shape and material for the deformed resin spring 50 are determined depending on a target characteristic.

Here, with respect to the spring constants of the coil spring 49 and the deformed resin spring 50, that of the deformed resin spring 50 is set larger than that of the coil spring 49 so that the coil spring 49 starts deforming before when the piston 47 comes into a backward stroke. The coil spring 49, made of metal, has a linear spring characteristic while the deformed resin spring 50 has a hysteresis characteristic (damping characteristic). For this reason, in the case of the hydraulic loss simulator 45, for an initial period in a backward stroke, a characteristic in which an increment in a reaction force is moderate is gained mainly due to the coil spring 49, while a damping characteristic in which an increment in a reaction force is large is gained mainly due to the deformed resin spring 50 for a latter period in the backward stroke.

In this brake system, under the CBS control, in the brake circuit where a braking operation is performed after that performed in the other brake circuit, operation liquid is introduced into the hydraulic loss simulator 45 from the master cylinder 3. However, at this time, in the hydraulic loss simulator 45, multiple reaction forces are generated in the springs 49 and 50 of the two different kinds as described above. Therefore, a rider can feel a natural braking operation from which he or she feels little or no difference relative to operation in a brake system of direct operation, although this brake system has a very simple structure.

Furthermore, in the unit body 40, there is provided a bypass passage 55 which communicates with the hydraulic loss simulator 45, bypassing the third electromagnetic on-off valve 44 with an upper portion away from the first electromagnetic on-off valve 7 for the main brake constituent passage 5*a*. In the bypass passage 55, there is provided a check valve 56 which permits the flow of operation fluid from the hydraulic loss simulator 45 to the input port 41 (in the direction of the master cylinder 3). Accordingly, even when the CBS control comes into an off state while operation liquid has been introduced into the hydraulic loss simulator 45 and its situation is remained as it is, the operation liquid in the hydraulic loss simulator 45 is securely returned to the master cylinder 3 through the bypass passage 55. Because of this, the piston 47 in the hydraulic loss simulator 45 is returned to an initial position, thus providing the same feeling to a rider in a braking operation when the CBS control is resumed in operation.

In this embodiment, the first electromagnetic on-off valve 7 and the hydraulic loss simulator 45 are integrally fixed to the passage switching unit 8 so that both are compactly formed into a block. Further, in this embodiment, not only the first electromagnetic on-off valve 7, but the pressure sensor 10 at an input side and the third electromagnetic on-off valve 44 are also integrally fixed to the passage switching unit 8, hence increasing the degree of denseness in functional components and resulting in that it is very advantageous in mounting these functional components on a vehicle.

Furthermore, in the passage switching unit 8, the first and third electromagnetic on-off valves 7, 44, each of which is a functional component with a long axis, and the pressure sensor 10 are fixed into the unit body 40 in parallel to the hydraulic loss simulator 45. This gives an advantage in making the passage switching unit 8 compact.

Incidentally, in the passage switching unit 8, the relative positions of the first and third electromagnetic on-off valves 7 and 44 are deviated in the axial direction, and a passage (a portion of the main brake constituent passage 5*a* and a portion of the branched passage 43) leading from the input port 41 to the third electromagnetic on-off valve 44 is formed straight. This produces an advantage in modifying the passage.

In view of the above description for the components, operations in the entire brake system will be described. However, it is assumed that the mode selection switch 13 is set in a mode allowing the CBS. While a vehicle is in a driving mode, when a rider operates the brake operation lever 2 either for the front wheel or the rear wheel, in both brake circuits, the first, second, and third electromagnetic on-off valves 7, 18, 44 are all energized. When the main brake passage 5 is separated from the master cylinder 3 with the first electromagnetic on-off valve 7, the master cylinder 3 and the hydraulic loss simulator 45 communicate by setting the second electromagnetic on-off valve 44 to an "on" state, and further the hydraulic pressure modulator 6 and the main brake passage 5 communicate by setting the second electromagnetic on-off valve 18 to an "on" state. This, hence, enables a rider to feel a braking operation simulated by the hydraulic loss simulator 45, and, at the same time, blocks transmission of a fluctuation in hydraulic pressure to the rider, the fluctuation being caused by an operation of the hydraulic pressure modulator 6. Meanwhile, in parallel to the above, the hydraulic pressure modulator 6 and the electrically-operated motor 23 are caused to be operated, and the cam roller 25 pushes up the piston 16 to put pressure on the operation fluid in the hydraulic pressure chamber 17. Hydraulic pressure in response to the control for the electrically-operated motor 23 is, thereafter, supplied to the brake caliper 4 via the main brake passage 5.

At this time, hydraulic pressure supplied from the hydraulic pressure modulator 6 to the brake caliper 4 is set to a distribution ratio in which the hydraulic pressures at the front and rear brakes are predetermined. Under such CBS control, when a state is detected in which a wheel at the side where the modulator is operative almost comes to locking, the piston 16 is caused to be put into the backward direction by controlling the electrically-operated motor 23 with the controller 9 to lower the braking pressure at the brake caliper 4, hence avoiding locking of the wheel.

However, as has been described above, when the ABS control starts and the piston 16 in the hydraulic pressure modulator 6 is backed, the cam roller 25 on the camshaft 24 rotates with an eccentricity so as to compress the backup springs 34*a* and 34*b* via the lifter 29. When the ABS is in a normal operation, a movement in an upward direction for the piston 16 from this state is basically effected under an action of force produced by the electrically-operated motor 23. However, when the electrically-operated motor 23 comes to be not energized due to some cause during performing of the ABS control, the piston 16 is returned to the neutral reference position under an action of forces generated by the backup springs 34*a* and 34*b*, and the operation liquid saved in the hydraulic pressure chamber 17 is returned to the main brake passage 5. In addition, if the second electromagnetic on-off valve 18 simultaneously becomes de-energized, the main supply-and-discharge passage 19 in the hydraulic pressure modulator 6 is closed, but the operation liquid in the hydraulic pressure chamber 17 is returned to the main brake passage 5 through the bypass passage 38 and the check valve 39.

When the vehicle stops under this series of operations, it is in a state where hydraulic pressure by the hydraulic pressure modulator 6 has been applied to both wheels' sides. However, when a certain period of time elapses following the stop of the vehicle, the brake system is shifted into a current suppressing mode to stop operating the hydraulic pressure modulator 6 (electrically-operated motor 23).

In such an current suppressing mode, energizing is first stopped to the second electromagnetic on-off valve 18 of the hydraulic pressure modulator 6 at the side where the brake caliper 4 is under pressure. Because of this, the communication between the modulator 6 and the main brake passage 5 is interrupted, and the electrically-operated motor 23 is caused to be stopped. At this time, hydraulic pressure generated in the hydraulic pressure modulator 6 remains active in the main brake passage 5 and on the brake caliper 4, hence retaining the braking force.

Next, energization is stopped to the first and third electromagnetic on-off valves 7 and 44 in the passage switching unit 8. This causes the communication between the master cylinder 3 and the hydraulic loss simulator 45 to be interrupted by closing the third electromagnetic on-off valve 44, and causes, at the same time, the master cylinder 3 and the brake caliper 4 on the main brake passage 5 to be opened by opening the first electromagnetic on-off valve 7. At this time, hydraulic pressure generated in the hydraulic pressure modulator 6 remains active in the main brake passage 5, hence retaining a stroke at the side where the master cylinder 3 is present.

The brake system is shifted to the current suppressing mode in the above-described order, whereby it is switched to a braking mode by the master cylinder 3 without giving any discomfort to the rider. Even after an operation of the electrically-operated motor 23 is stopped, a braking force is securely retained. Therefore, power consumption of the electrically-operated motor 23 is curbed, and in addition, wear of motor brush of the electrically-operated motor 23, and the like can be reduced. Furthermore, power consumption of each of the electromagnetic on-off valves 7, 18, and 44 can also be suppressed at the same time.

When the rider releases the braking operation after the above operations, the operation fluid is returned from the brake caliper 4 to master cylinder 3, and at the same time, the operation fluid left in the hydraulic loss simulator 45 is returned to the master cylinder 3 via the bypass passage 55 and the check valve 56. When the hydraulic pressure at the input side in the brake circuit becomes equal to the atmosphere pressure, the controller 9 opens the second electromagnetic on-off valve 18, and simultaneously activates the electrically-operated motor 23 to return the piston 16 in the hydraulic pressure modulator 6 to the neutral reference position.

While all the above-described are the basic operations for the brake system, starting conditions of the CBS controls can be controlled by the controller 9 depending on a braking operation amount (hydraulic pressure at the input side in the brake circuit), the speed of a vehicle, and the like. For example, in a range where the braking operation amount is small, a braking operation is performed to each of the front and rear wheels by applying thereon the hydraulic pressure in the master cylinder 3 without performing CBS control. Only when a braking operation amount is relatively large, the CBS control, which uses the hydraulic pressure modulator 6, may be performed. Furthermore, when braking operations in the front and rear are performed simultaneously and in a large degree, it may be possible to reduce the power consumption by applying the hydraulic pressure in the master cylinder 3 without performing CBS control.

In addition, in the brake system of this embodiment, a number of kinds of control modes for the controller 9 are prepared so that a rider can switch from one mode to another using the mode selection switch 13.

In such a brake system, a rider can switch into any of the control modes, as needed, depending on an environment for use of a vehicle, driving conditions, and the like. This allows the rider to perform a braking operation which matches his/her own preference.

The controller may estimate a traveling condition based on information such as engine revolutions and vehicle speed, and may automatically select a mode depending on the traveling condition.

Control modes other than those described above may be prepared in advance. There may be prepared control modes in which a distribution ratio of hydraulic pressure for front and rear wheels is fixed in response to an operational amount in braking, or in which start conditions for a CBS control are different from each other.

Meanwhile, in this brake system, in the case where a CBS control is performed with a braking operation for the front wheel which is synchronized with that for the rear wheel, a distribution ratio of hydraulic pressure for front and rear wheels when a braking force for the front wheel is increased (an operation amount in braking is increased) is different from that when a braking force for the front wheel is decreased (an operation amount in braking is decreased).

That is, when a braking force for the front wheel is increased, hydraulic pressure is controlled so that a braking force for the rear wheel is gradually increased until the braking force for the front wheel reaches a certain region; then, the braking force for the rear wheel is maintained substantially constant until the braking force for the front wheel reaches a setting value; and thereafter the braking force for the rear wheel is gradually decreased after the braking force for the front wheel is increased beyond the setting value. In this manner, under such a situation where the braking force for the front wheel is increased, controlling the braking force for the rear wheel makes it possible to cope with enhancement of the efficiency of braking at an initial stage of braking, and reduction of a rear wheel contact load at a latter stage in braking.

On the other hand, when the braking force for the front wheel is decreased after the braking force for the front wheel becomes greater than or equal to a setting value, hydraulic pressure is controlled so that the braking force for the rear wheel is maintained as it is, or is gradually decreased in response to a decrease in the braking force for the front wheel (see arrows in FIG. 13A). Under such a situation where the braking force for the front wheel is decreased, a gradual increase in the braking force for the rear wheel is curbed so that increase in slip ratio at the rear wheel is circumvented, thus providing braking operation which a rider feels natural.

Figure 14:
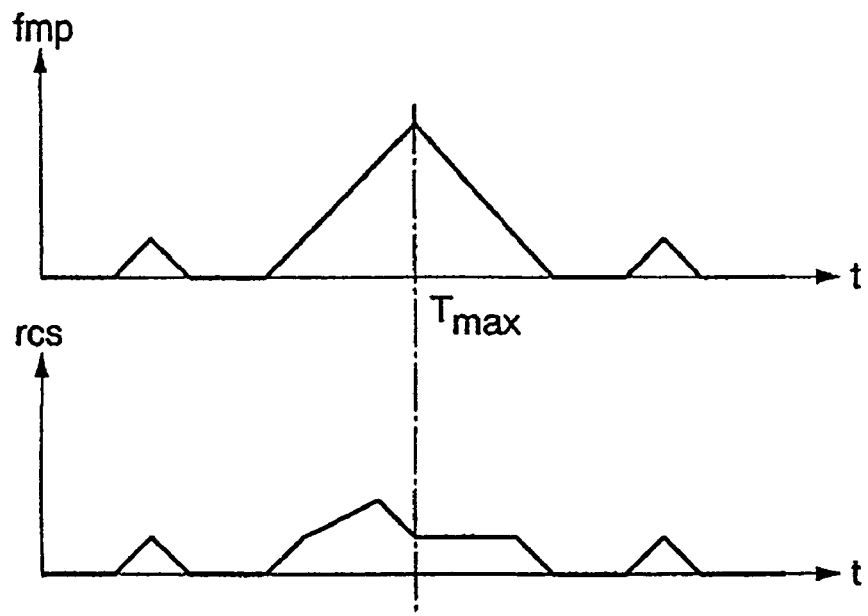
FIG. 14 is a characteristic diagram showing variation with time with respect to a master cylinder pressure fmp for the front wheel and a CBS pressure rcs according to the embodiment.
Figure 15:
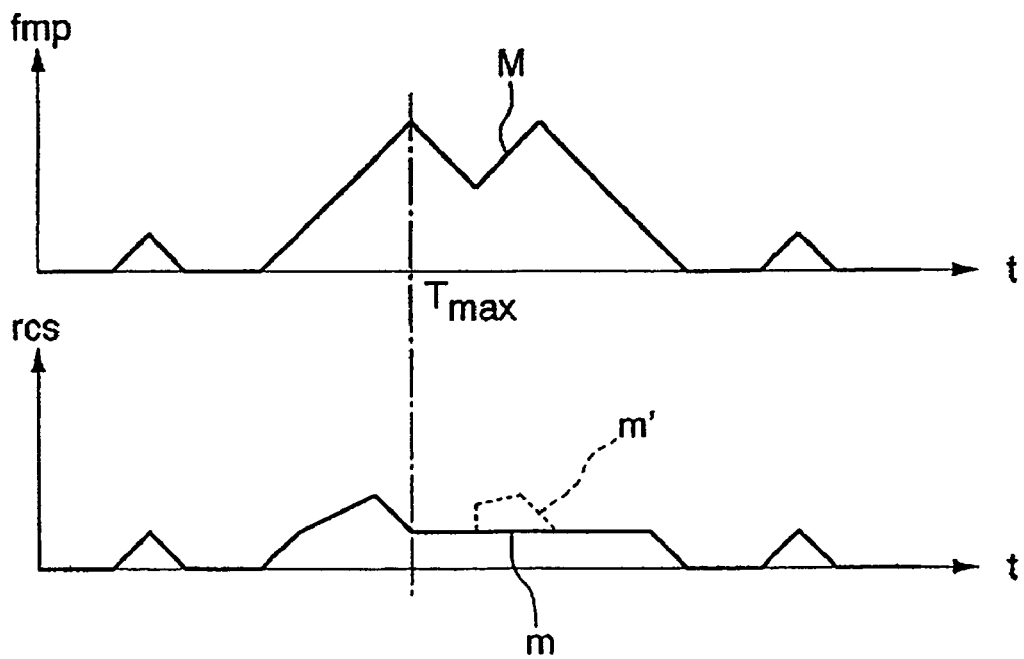
FIG. 15 is a characteristic diagram showing variation with time with respect to the master cylinder pressure fmp for the front wheel and the CBS pressure rcs, when the degree of gripping of a brake is increased, according to the same.

FIG. 14 is a characteristic diagram in which the axis of abscissa represents time, and the axis of ordinate represents a master cylinder pressure for the front wheel and a brake caliper pressure for the rear wheel in this embodiment. As shown in the figure, when an amount of braking operation is decreased after an amount of brake operation for the front wheel (master cylinder pressure fmp) attains maximum, the braking hydraulic pressure (rcs) for the rear wheel is retained at a constant pressure for a time without increasing, and is, thereafter, gradually decreased.

Here, a specific process will be described with reference to FIGS. 15 to 23, the specific process being one in which a control for retaining the braking force for the rear wheel as a constant is adopted when a braking operation for the front wheel is decreased.

Figure 19:
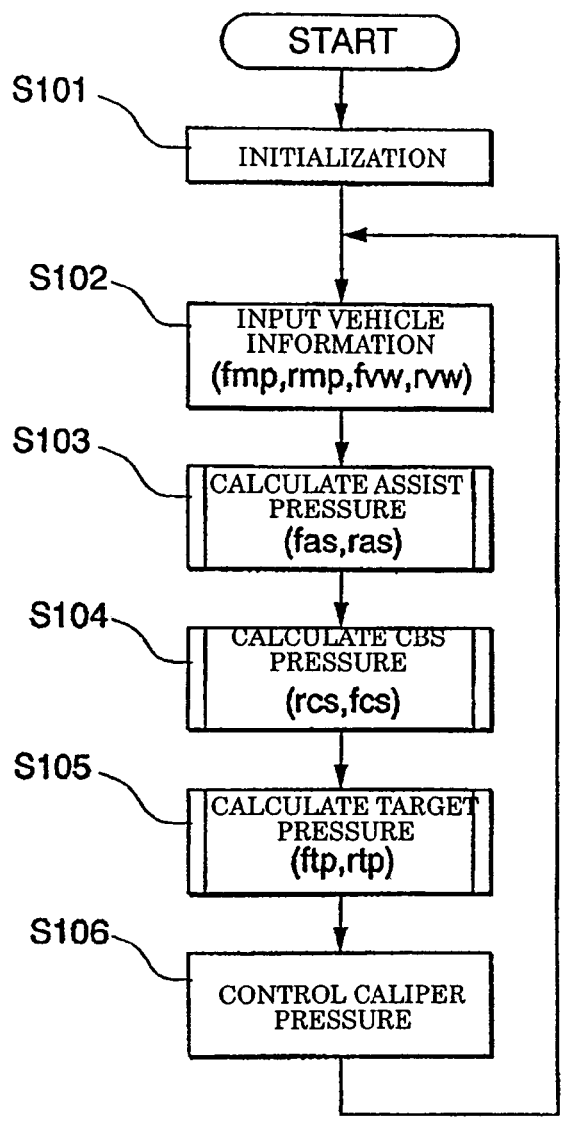
FIG. 19 is a flowchart showing a CBS control according to the same.

Firstly, a CBS control by a controller will be described. As shown in FIG. 19, in S101, variables in a memory are initialized, and, thereafter, in S102, vehicle information such as master cylinder pressures fmp and rmp for the front wheel and for the rear wheel, a speed of a front wheel fvw, and a speed of a rear wheel rvw are read, and, in S103, assist pressures fas and ras where an amount of brake operation for the other wheel is taken into account are calculated. In S104, brake caliper pressures fcs and rcs for the front wheel and for the rear wheel by a CBS are calculated (hereinafter, a calculated value is referred to as "CBS pressure"). Furthermore, in S105, final target control pressures ftp and rtp are calculated, and in the next step S106, the hydraulic pressure modulator 6 (brake caliper pressure) is controlled to be a target control pressure.

Figure 20:
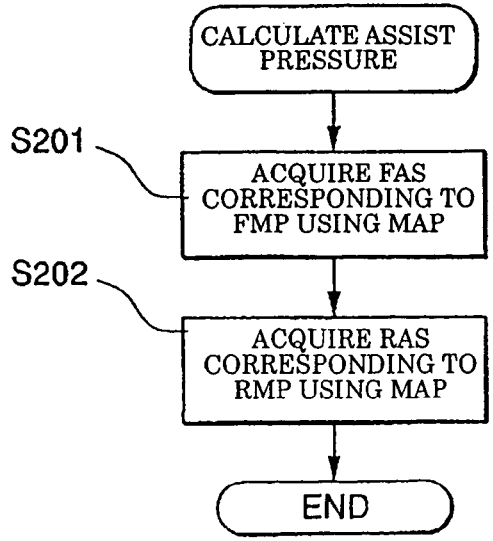
FIG. 20 is a flowchart showing a process of calculating an assist pressure in the CBS control according to the same.

A calculation for an assist pressure in S103 is intended to obtain the assist pressures fas and ras corresponding respectively to the master cylinder pressures fmp and rmp for the front wheel and for the rear wheel with reference to an unillustrated map in S201 and S202 in FIG. 20.

Figure 21:
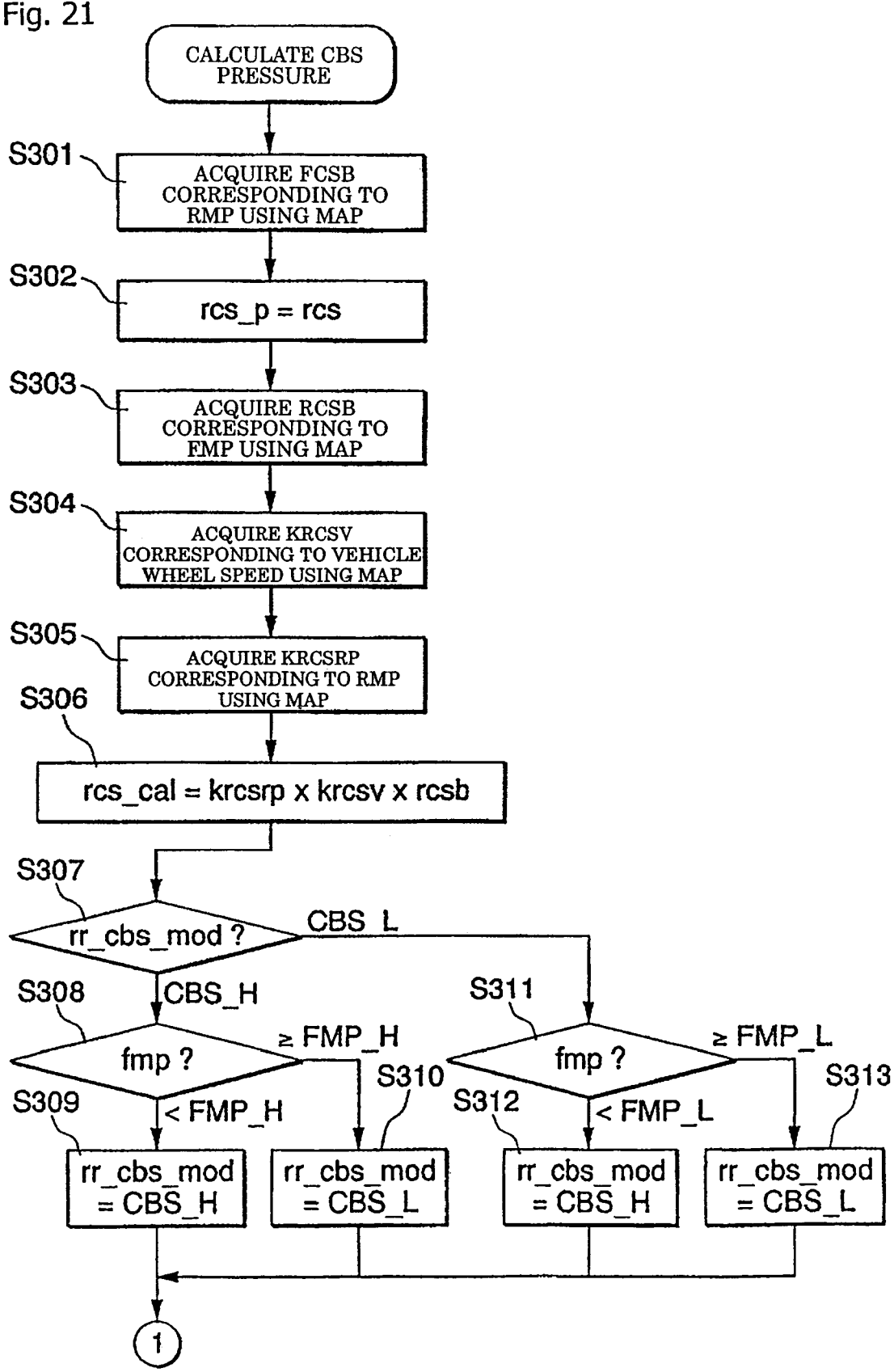
FIG. 21 is a flowchart showing a process of calculating a CBS pressure in the CBS control according to the same.

On the other hand, the calculations for the CBS pressures fcs and rcs in S104 are carried out as shown the flow chart of FIG. 21. That is, firstly, in S301, a CBS base pressure fcsb for the front wheel corresponding to the master cylinder pressure rmp for the rear wheel is calculated with reference to a map not shown in the figure. Then, the CBS pressure rcs for the rear wheel at the time of a previous process is substituted for a variable rcs_p showing the CBS pressure for the rear wheel at the time of the previous process. In the next step S303, a CBS base pressure rcsb for the rear wheel corresponding to the master cylinder pressure fmp for the front wheel is obtained with reference to the maps shown in FIGS. 16 to 18. Further, in S304 and S305, with reference to respective maps not shown, a correction coefficient krcsv corresponding to a vehicle wheel speed and a correction coefficient krcsrp corresponding to the master cylinder pressure rmp are obtained. Thereafter, in S306, the CBS base pressure rcsb is multiplied by the correction coefficients krcsv and krcsrp, and a result thus obtained is substituted for a variable rcs_cal showing a calculated pressure for the CBS.

In the next step S307, a determination on the current CBS control mode for the rear wheel is made, and, in S308 and S311, a determination on the master cylinder pressure fmp for the front wheel is made.

To illustrate the present embodiment, two kinds of CBS control modes are described herein. The two CBS control modes are a basic mode CBS_H and a braking release mode CBS_L. The basic mode CBS_H is a hydraulic pressure control mode where the pressure changes along a characteristic line J in FIG. 16 when the master cylinder pressure fmp takes values between zero (an amount of braking operation is zero) and a specified higher value FMP_H. The braking release mode CBS_L is a hydraulic pressure control mode where the pressure changes after the master cylinder pressure fmp (an amount of braking operation) goes beyond the specified higher value FMP_H, and is retained constant mainly when a braking release is made (when an amount of braking operation is decreased) as shown with a characteristic line K in FIG. 16.

To be precise, these two kinds of CBS control modes are set to change according to the conditions in Table 1 below. Specifically, in Table 1, the left side of the arrow indicates the state of the current CBS control mode and the state of the current master cylinder pressure fmp for the front wheel (a magnitude relations with the specified values FMP_H and FMP_L), and the right side of the arrow indicates a CBS control mode which is changed according to these conditions.

TABLE 1

| rr_cbs_mod | fmp | | rr_cbs_mod |
|---|---|---|---|
| CBS_H | <FMP_H | | CBS_H |
|  | FMP_H | ⇒ | CBS_L |
| CBS_L | <FMP_L | | CBS_H |
|  | FMP_L | | CBS_L |

Following each of the determined results in S308 and S311, in the steps S309 and S310, and in the steps S312 and S313, the CBS control mode is changed according to the current CBS control mode and the master cylinder pressure fmp. Here, changes in the control mode are the same as those in Table 1.

Subsequently, in S314 of FIG. 22, a determination is made as to which of the basic mode CBS_H and the braking release mode CBS_L the changed CBS control mode corresponds to. When the CBS control mode corresponds to the basic mode CBS_H, the process goes to S315, and when the CBS control mode corresponds to the braking release mode CBS_L, the process goes to S316.

Meanwhile, in S316, on comparing the variable rcs_cal (refer to S306) indicating the calculated pressure for the CBS, and the variable rcs_p (refer to S302) indicating the CBS pressure at the time of the previous process, if the calculated pressure rcs_cal is greater than the CBS pressure rcs_p at the time of the previous process, the process goes to S317, and if the calculated pressure rcs_cal is equal to or smaller than the CBS pressure rcs_p at the time of the previous process, the process goes to S318.

In S315 and S317, the CBS pressure rcs is determined to be the calculated pressure rcs_cal obtained in S306, and in S318, the CBS pressure rcs is determined to be the CBS pressure rcs_p at the time of the previous process.

The above-described processes will be summarized in Table 2 as follows.

TABLE 2

| rr_cbs_mod | rcs |
|---|---|
| CBS_H | rcs_cal |
| CBS_L | Either one which is smaller of rcs_p and rcs_cal |

Figure 22:
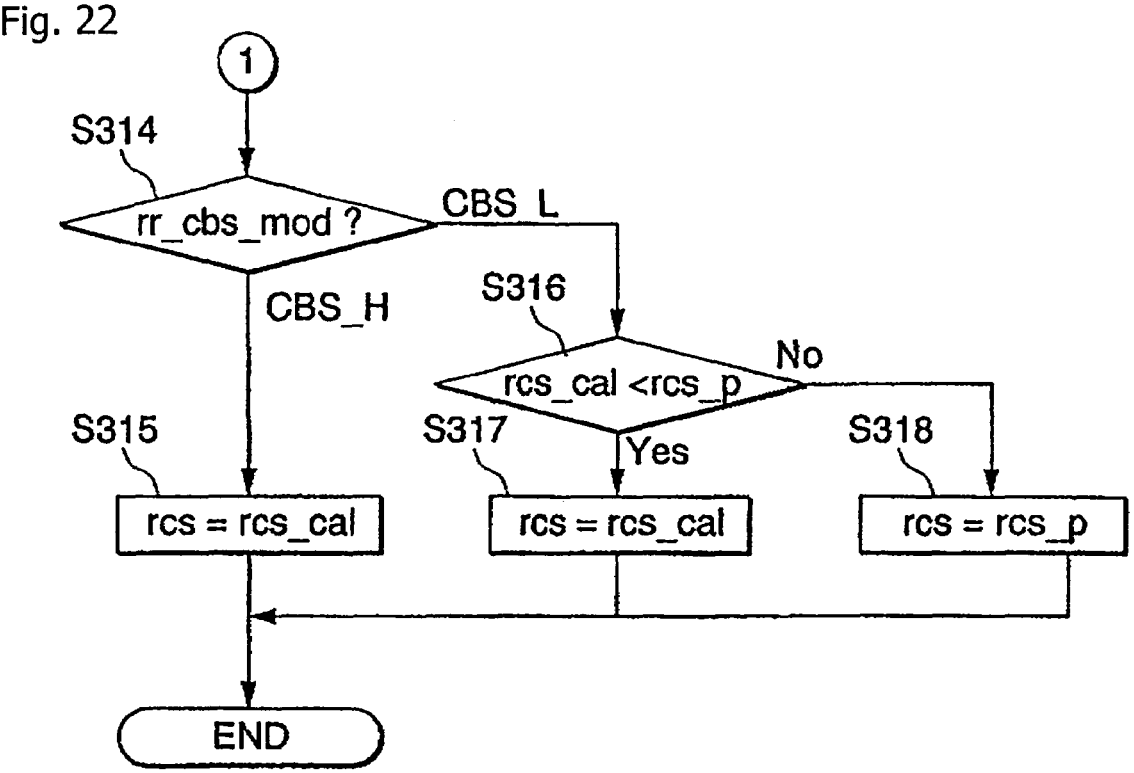
FIG. 22 is a flowchart following that in FIG. 21 according to the same.

That is, in the final step for the process in FIG. 22, when the CBS control is the basic mode CBS_H, the CBS pressure rcs is caused to be the calculated pressure rcs_cal, and, when the CBS control is the braking release mode CBS_L, the CBS pressure rcs is caused to be either one which is smaller of the calculated pressure rcs_cal and the CBS pressure rcs_p at the time of the previous process.

Figure 23:
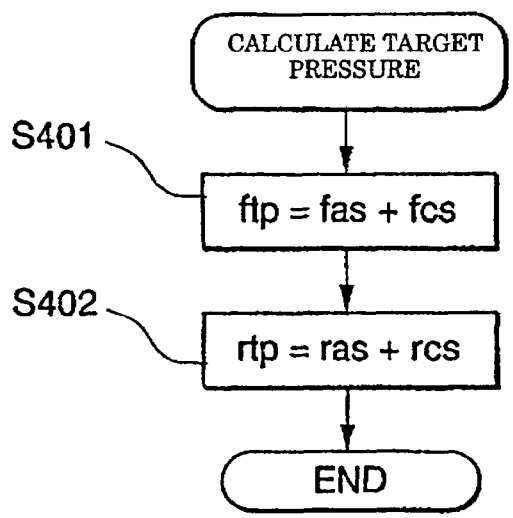
FIG. 23 is a flowchart showing a process of calculating a target pressure in the CBS control according to the same.

Then, after the CBS pressure rcs is thus determined, in S401 and S402 shown in FIG. 23, the assist pressures fas and ras, and the CBS pressures fcs and rcs are respectively added up to obtain the target control pressures ftp and rtp for the front and rear wheels.

Figure 24:
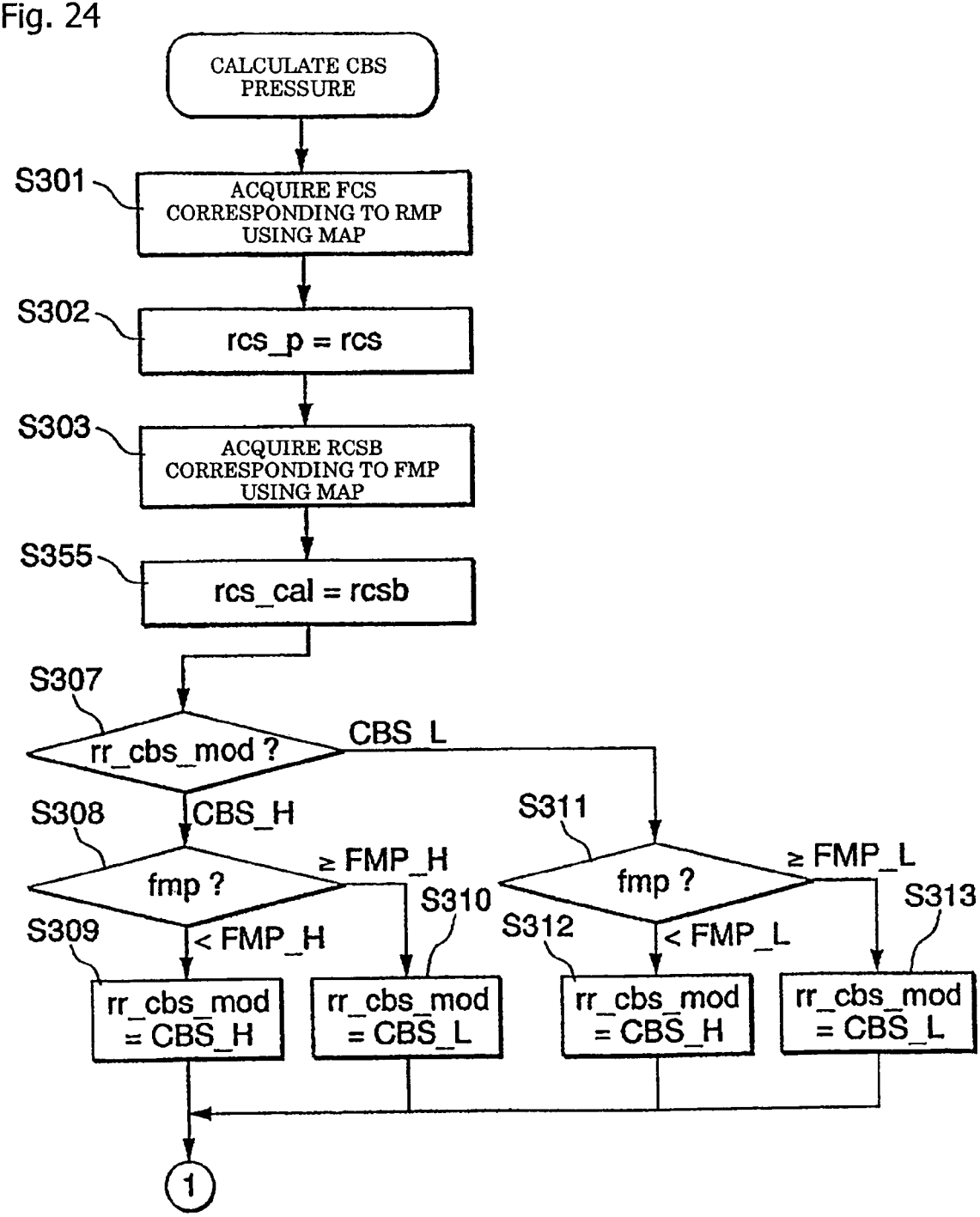
FIG. 24 is a flowchart showing a modified example corresponding to that shown in FIG. 21 according to the same.

Incidentally, in the calculation processes for the CBS pressure in FIGS. 21 and 22, the correction coefficients krcsv and krcsrp are obtained in S304 and S305, and subsequently, in S306, the CBS base pressure fcsb is multiplied by the correction coefficients krcsv and krcsrp to obtain the calculated pressure for the CBS rcs_cal. However, as shown in the calculation process of FIG. 24, it is also possible to substitute the CBS base pressure fcsb as it is for the calculated pressure for the CBS rcs_cal, without multiplying the CBS base pressure fcsb by the correction coefficients krcsv and krcsrp.

When the assist pressures fas and ras are assumed to be small at this point, the braking hydraulic pressure for the rear wheel according to the CBS is approximately equal to the CBS pressure rcs that is determined in the previous flow. Therefore, a description will be provided below assuming that the assist pressures fas and ras are zero or sufficiently small for the sake of simplifying explanation.

Figure 16:
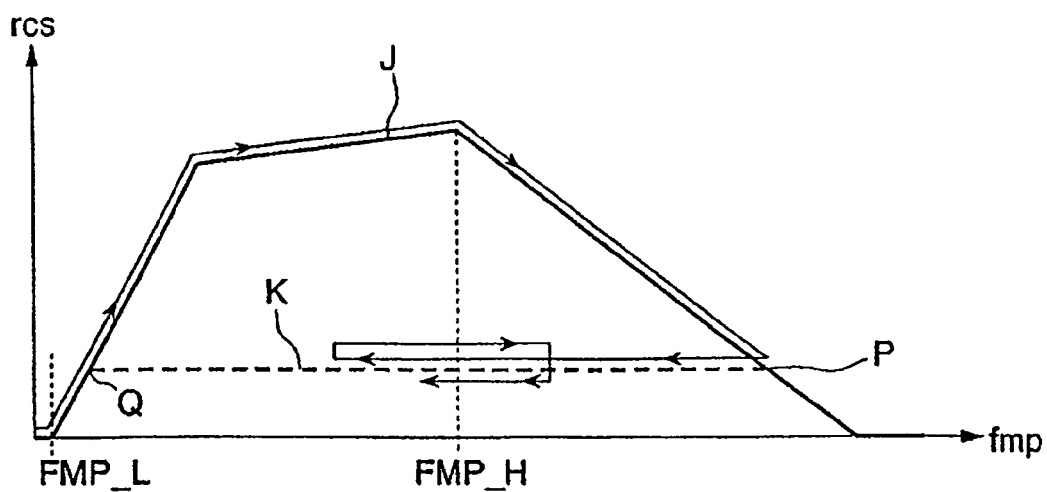
FIG. 16 is a characteristic diagram for the master cylinder pressure fmp and the CBS pressure rcs, in a CBS control, according to the same.

When a control is performed following the above-described calculation process for the CBS pressure rcs, the CBS pressure rcs (braking hydraulic pressure for the rear wheel) gradually increases as shown in FIG. 16 as the master cylinder pressure fmp (an amount of braking operation) for the front wheel increases, and when the master cylinder pressure fmp goes beyond the specified higher value FMP_H, the CBS control mode is changed from the basic mode CBS_H to the braking release mode CBS_L. When the master cylinder pressure fmp further increases after this state, the CBS pressure rcs gradually decreases depending on the increase in master cylinder pressure fmp. Up to this point, the processes are those in S315 and S317 in the aforementioned process, where the CBS pressure rcs is set as the calculated pressure rcs_cal.

Next, after a braking operation for the front wheel is eased, the master cylinder pressure fmp decreases, and then the CBS pressure rcs (braking hydraulic pressure for the rear wheel) is retained constant so as to remain at the pressure corresponding to when the master cylinder pressure fmp is (an amount of braking operation is) at a maximum value. Furthermore, even if the brake undergoes an operation of increasing the degree of gripping, or a braking release operation, the CBS pressure rcs at this time is retained constant as long as it is in between P and Q in FIG. 16. The control in this stage is the process in S318 in the aforementioned flow diagram, and, at this time, the CBS pressure rcs has been set as the CBS pressure rcs_p at the time of the previous process.

Accordingly, once entering the braking release mode CBS_L, even if the degree of gripping of the brake is increased for braking after the amount of braking operation is decreased, the CBS pressure rcs (braking hydraulic pressure for the rear wheel) is not rapidly raised. That is, when the degree of gripping of the brake is increased, the CBS pressure rcs (braking hydraulic pressure for the rear wheel) shows a characteristic indicated by the line m in FIG. 15 and is not raised as indicated by the line m' in FIG. 15.

Figure 17:
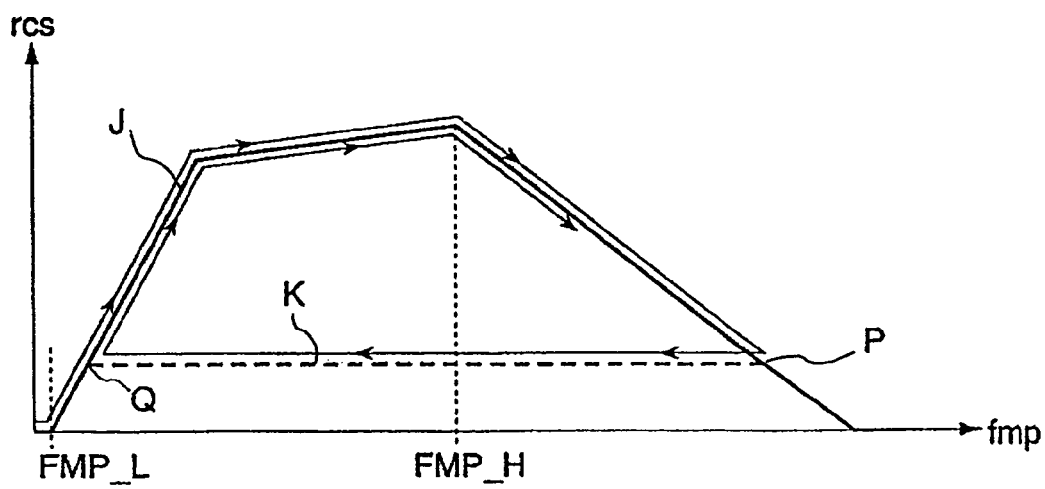
FIG. 17 is another characteristic diagram for the master cylinder pressure fmp and the CBS pressure rcs, in the CBS control, according to the same.

Meanwhile, the braking release mode CBS_L is returned to the basic mode CBS_H according to a reset condition where the master cylinder pressure fmp decreases in a manner that the characteristic line K shown in FIG. 17 crosses the characteristic line J of the basic mode CBS_H shown in FIG. 17.

Figure 18:
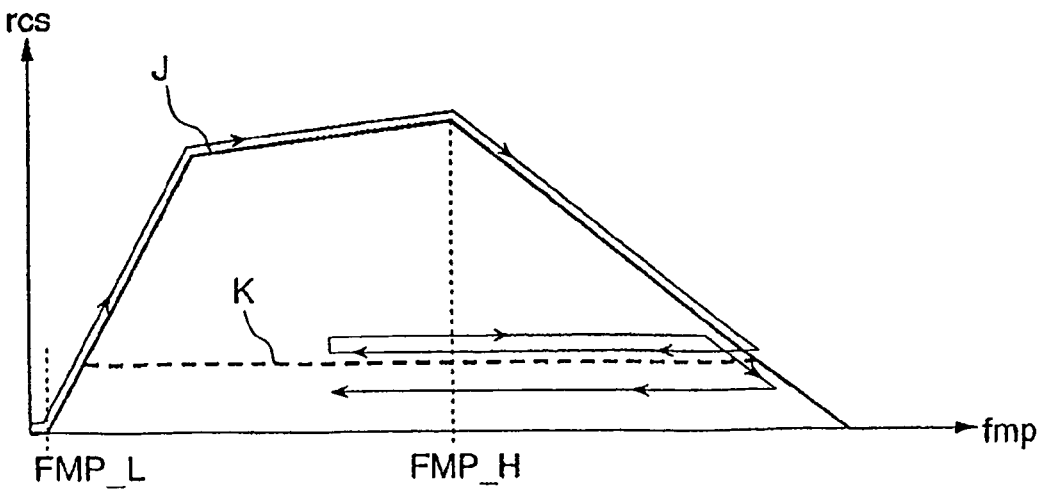
FIG. 18 is still another characteristic diagram for the master cylinder pressure fmp and the CBS pressure rcs, in the CBS control, according to the same.

Moreover, after the CBS pressure rcs (braking hydraulic pressure for the rear wheel) is retained constant following the change to the braking release mode CBS_L, when the maximum value of the master cylinder pressure fmp is updated through an increase in the degree of gripping of the brake, the CBS pressure rcs gradually decreases as the master cylinder pressure fmp increases (the amount of braking operation increases) as shown in FIG. 18. When the master cylinder pressure fmp decreases thereafter, a low CBS pressure rcs is retained constant as to be the one at the time when the maximum value of the master cylinder pressure fmp is updated.

While there have been described above the specific processes where the control, which retains constant a braking force for a rear wheel when a braking operation for a front wheel is eased, is adopted. It is, however, possible to change the above control to a control where the braking force for the rear wheel gradually decreases when the braking operation for the front wheel decreases, by changing part of the processes in S314 to S318 in FIG. 22.

To be more specific, that can be realized by changing the content in Table 2 to that in Table 3 below.

TABLE 3

| rr_cbs_mod | rcs |
|---|---|
| CBS_H | rcs_cal |
| CBS_L | Either one which is smaller of rcs_cal and rcs_cal2 |

Figure 25:
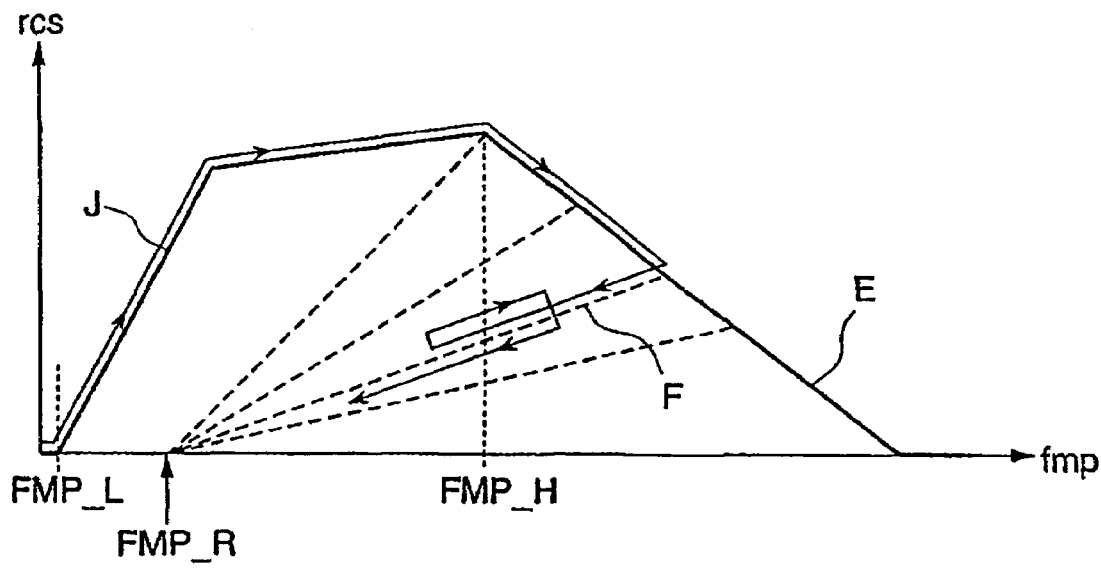
FIG. 25 is a characteristic diagram for the master cylinder pressure fmp and the CBS pressure rcs in the CBS control according to the same.

Here, cal2 in Table 3 is a value which can be obtained by making use of a straight line (or a curve) joining a point on a gradual decrement characteristic line E when the master cylinder pressure fmp increases in a characteristic diagram of FIG. 25, and a fixed point FMP_R on an axis where the CBS pressure rcs is zero.

In this case, after the master cylinder pressure fmp goes beyond FMP_H and the CBS control mode is changed from the basic mode CBS_H to the braking release mode CBS_L, when the master cylinder pressure fmp (an amount of braking operation) decreases, the CBS pressure rcs where the master cylinder pressure fmp is at a maximum value gradually decreases along a characteristic line F shown in FIG. 25. Further, when an operation of increasing the degree of gripping or a braking release operation is performed from this stage on, the CBS pressure rcs gradually decreases or increases along the characteristic line F as shown by arrows in FIG. 25. When increasing the amount of grip for braking, the CBS pressure rcs increases. However, this increase is not rapid, and does not make a rider feel a change in braking.

Figure 26:
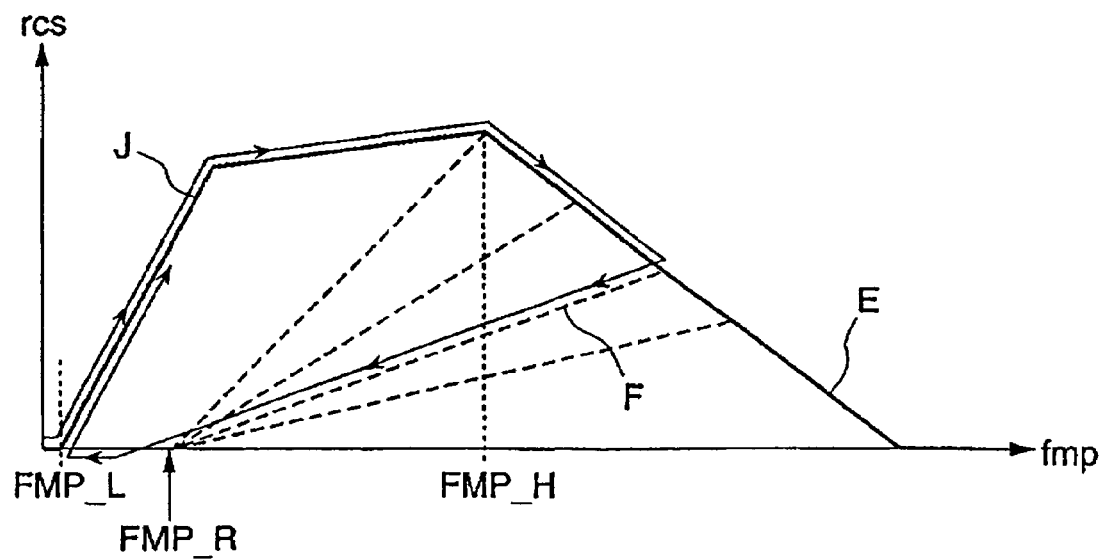
FIG. 26 is another characteristic diagram for the master cylinder pressure fmp and the CBS pressure rcs in the CBS control according to the same.

In this example, when the CBS control is in the braking release mode CBS_L, once the CBS pressure rcs attains a lower limit of hydraulic pressure as the master cylinder pressure fmp decreases, the CBS pressure rcs comes to a state where the CBS pressure rcs retains the lower limit of hydraulic pressure even when the master cylinder pressure fmp further decreases, as shown in FIG. 26. Then, once the master cylinder pressure fmp decreases down to FMP_L and is in a state of reaching the characteristic line J of the basic mode CBS_H, the braking release mode CBS_L returns to the basic mode CBS_H by making that state as a reset condition.

Figure 27:
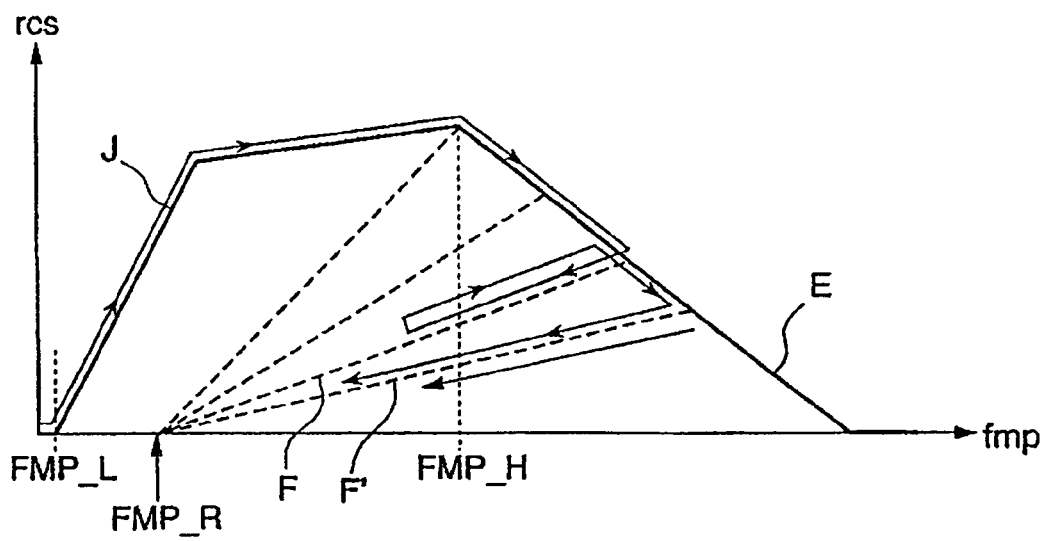
FIG. 27 is still another characteristic diagram for the master cylinder pressure fmp and the CBS pressure rcs in the CBS control according to the same.

Meanwhile, after the CBS control has been changed to the braking release mode CBS_L and the CBS pressure rcs gradually decreased along the characteristic line F, when the maximum value of the master cylinder pressure fmp is updated by increasing the degree of gripping of a brake, the CBS pressure rcs gradually decreases as the master cylinder pressure fmp increases (increase in an amount of braking operation) as shown in FIG. 27. Then, when the master cylinder pressure fmp decreases, the hydraulic pressure gradually decreases along the characteristic line F' from a low CBS pressure rcs at the time when the maximum value of the master cylinder pressure fmp is updated.

Moreover, for this brake system, when a CBS control is performed in which a braking operation for the rear wheel is synchronized with that for the front wheel, a distribution of braking force for the front wheel may be controlled as follows.

Figure 28:
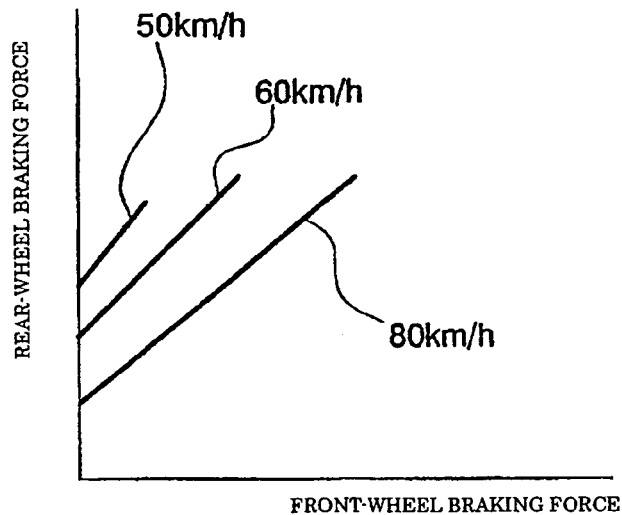
FIG. 28 is a braking force distribution characteristic diagram for front and rear wheels when a braking operation for the rear wheel is performed, according to the same.

That is, as shown in FIG. 28, a distribution characteristic of a front-wheel braking force to a rear-wheel braking force is determined beforehand for every vehicle speed, so that, when a braking operation for the rear wheel is started, the braking force for the front wheel is controlled all the time with the distribution characteristic corresponding to a speed at the time of starting the braking operation. Hence, if an operation amount of braking for the rear wheel is maintained constant, a braking force at a constant distribution ratio is applied to the front wheel for a period of time before the vehicle comes to a complete stop. It is preferable for a braking force distribution characteristic, which is predetermined for every vehicle speed, that, for instance, when a vehicle speed is 50 km/h, no front-wheel braking force is applied until a rear-wheel braking force (hydraulic pressure) reaches a certain value, and when the rear-wheel braking force has exceeded the certain value, the front-wheel braking force increases as the rear-wheel braking force increases; and as the vehicle speed increases to 60 km/h and 80 km/h, a start point for the distribution of the front-wheel braking force and a distribution ratio thereof are respectively increased. Further, in this case, a braking force is not distributed to the front wheel when the vehicle speed is lower than a certain speed (50 km/h, for example).

Figure 29:
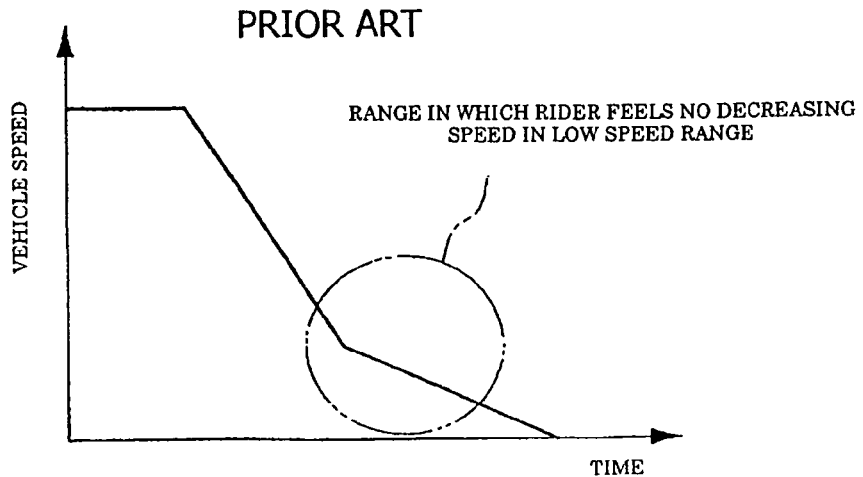
FIG. 29 is a speed decrease characteristic diagram for a vehicle when a braking operation for the rear wheel is performed, in the case of a comparative example.

In this brake system, with respect to the CBS control in a braking operation for the rear wheel, since a braking operation for the front wheel is controlled all the time with a braking force distribution characteristic corresponding to a vehicle speed at the start of the braking operation, abrupt change in a speed decrement slope does not occur as shown in FIG. 29 even for the case where a braking operation is performed for a vehicle being driven at a high speed.

Furthermore, in this brake system, when a braking operation is performed for a vehicle being driven at a high speed, a braking force distribution for the front wheel becomes large, hence obtaining a high braking efficiency. Meanwhile, when a braking operation is performed for a vehicle being driven at a low speed, a braking force distribution for the front wheel becomes small (no distribution being included), hence preventing the front wheel from being subjected to a large braking force in such a case that the vehicle passes through between other vehicles.

The braking force distribution characteristic, which is determined beforehand for every vehicle speed, is arbitrary, not limited to those shown in FIG. 28. For example, a braking force distribution for the front wheel may be set to suddenly increase when an amount of braking operation (braking force) goes beyond a certain value for each speed.

In this case, a braking effect will be provided more swiftly in such cases as a braking operation is performed in order to stop quickly.

Moreover, the present invention is applicable not only to a brake system employing hydraulic pressure, but also to a brake system or the like having a braking mechanism using air and a braking mechanism being electrically operated.

While a working example of the present invention has been described above, the present invention is not limited to the working example described above, but various design alterations may be carried out without departing from the present invention as set forth in the claims.

What is claimed is:

1. A brake system for a two-wheeled motor vehicle having a front wheel and a rear wheel with each of said wheels having a wheel brake associated therewith, said brake system comprising:
   an electronic controller which is capable of synchronizing a braking operation of either the front wheel or the rear wheel with a braking operation of the other wheel, said controller being operable to electrically control a braking force applied by the wheel brakes in response to a riding condition of the vehicle and a braking operation, wherein said controller is operable in any one of a plurality of control modes, and wherein each control mode comprises a unique way of distributing braking force to the front wheel brakes and to the rear wheel brakes; and
   wherein said brake system further comprises a manually operable mode selection switch for enabling manual selection of a control mode for the controller.

2. A brake system for a two-wheeled motor vehicle having a front wheel and a rear wheel with each of said wheels having a wheel brake associated therewith, said brake system comprising:
   a controller which is capable of synchronizing a braking operation of the front wheel with a braking operation of the rear wheel, said controller being operable to electrically control a braking force applied to each wheel brake in response to a riding condition of the vehicle and a braking operation,
   wherein, in the case where a braking operation of the front wheel is synchronized with a braking operation of the rear wheel, the controller is operable to change a braking force for the rear wheel from a gradually increasing force to a gradually decreasing force in response to an increase in a braking force for the front wheel, and the controller is further operable either to maintain the braking force applied to the rear wheel or to gradually decrease the braking force applied to the rear wheel, in response to a decrease in the braking force for the front wheel.

3. A method of operating a brake system on a two-wheeled motor vehicle having a front wheel and a rear wheel with each of said wheels having a wheel brake associated therewith, said method comprising the steps of:
   electrically controlling a respective braking force applied by each wheel brake in response to a riding condition for a vehicle and a braking operation, using an electronic controller,
   synchronizing operation of the front wheel brake with operation of the rear wheel brake,
   and when an amount of braking force applied to the front wheel increases beyond a predetermined threshold amount, changing a braking force applied to the rear wheel from a gradually increasing force to a gradually decreasing force in response to a further increase in the amount of braking at the front wheel; and,
   once the braking operation enters an operation area in which the braking force for the rear wheel is gradually decreased, corresponding to a time of increase in the amount of braking operation for the front wheel, when the amount of braking operation for the front wheel decreases after entering the operation area, changing operation of the controller to a braking release mode in which the braking force for the rear wheel is maintained at a constant level at a time where the amount of braking operation for the front wheel is at a maximum value.

4. The method of operating a brake system according to claim 3, wherein, after the control is changed to the braking release mode by the controller, the braking release mode is returned to a basic mode according to a reset condition, in which the amount of braking of the front wheel decreases down to a condition where the braking force for the rear wheel in the braking release mode is equal to that in the basic mode.

5. The method of operating a brake system according to claim 3, wherein, after the control is changed to the braking release mode by the controller, when the amount of braking operation for the front wheel increases beyond a predetermined value, the controller gradually decreases the braking force for the rear wheel in response to a further increase in the amount of braking operation for the front wheel, and, thereafter, when the amount of braking operation for the front wheel decreases, the braking force for the rear wheel at a time where the maximum value of the amount of braking operation for the front wheel is updated is maintained at a constant level.

6. A method of operating a braking system on a two-wheeled motor vehicle having a front wheel and a rear wheel with each of said wheels having a wheel brake associated therewith, said method comprising the steps of:
   electrically controlling a braking force applied to each wheel brake, using an electronic controller, in response to a riding condition for a vehicle and a braking operation,
   synchronizing operation of the front wheel brakes with the rear wheel brakes, using the electronic controller,
   and after an amount of braking operation for the front wheel increases beyond a predetermined threshold amount, changing a braking force applied to the rear wheel from a gradually increasing force to a gradually decreasing force in response to a further increase in the amount of braking force applied to the front wheel; and,
   once the braking operation enters an operation area in which the braking force for the rear wheel is gradually decreased at a time of increase in the amount of braking operation for the front wheel, when the amount of braking operation for the front wheel decreases after entering the operation area, changing operation of the controller to a braking release mode in which the braking force for the rear wheel is gradually decreased from the level of braking force applied to the rear wheel at a time when the amount of braking operation for the front wheel is at a maximum value.

7. The method of operating a brake system according to claim 6, wherein the braking release mode is such that, when the amount of braking operation for the front wheel becomes less than or equal to the amount of braking operation corresponding to when the braking force for the rear wheel reaches a lower limit of a braking force due to a gradual decrease of a braking force, the braking force for the rear wheel is maintained at the lower limit of the braking force.

8. The method of operating a brake system according to claim 6, wherein, after the control is changed to the braking release mode by the controller, the braking release mode is returned to a basic mode according to a reset condition, the reset condition comprising that the amount of braking operation for the front wheel decreases down to an amount of braking operation where the braking force for the rear wheel in the braking release mode is equal to that in the basic mode.

9. The method of operating a brake system according to claim 6, wherein, after the control is changed to the braking release mode by the controller, when the amount of braking operation for the front wheel increases beyond a predetermined value, the controller gradually decreases the braking force for the rear wheel in response to a further increase in the amount of braking operation for the front wheel, and, thereafter, when the amount of braking operation for the front wheel decreases, the braking force gradually decreases from the braking force for the rear wheel corresponding to a time where the maximum value of the amount of braking operation is updated.

10. The brake system for a two-wheeled motor vehicle according to claim 1, wherein in the case where a braking operation for the front wheel is synchronized with the wheel brakes for the rear wheel,
   a first control mode involves changing a braking force applied to the rear wheel from a gradually increasing force to a gradually decreasing force in response to an increase in a braking force for the front wheel, and maintaining the braking force applied to the rear wheel at a constant level in response to a decrease in the braking force for the front wheel, and
   a second control mode involves changing a braking force applied to the rear wheel from a gradual increase to a gradual decrease in response to an increase in braking force applied to the front wheel, and gradually decreasing the braking force applied to the rear wheel in response to a decrease in the braking force for the front wheel.

11. A method of operating a brake system on a two-wheeled vehicle having a front wheel and a rear wheel with each of said wheels having a wheel brake associated therewith, said method comprising the steps of:
   electrically controlling a braking force applied to each wheel brake in response to a riding condition of the vehicle and a braking operation such that a braking operation of the front wheel is synchronized with a braking operation of the rear wheel,
   changing a braking force applied to the rear wheel from a gradual increase to a gradual decrease in response to an increase in a braking force applied to the front wheel, and
   either maintaining the braking force applied to the rear wheel or gradually decreasing the braking force applied to the rear wheel, in response to a decrease in the braking force applied to the front wheel.

* * * * *